United States Patent
Lee et al.

(10) Patent No.: US 11,963,035 B2
(45) Date of Patent: Apr. 16, 2024

(54) METHOD AND APPARATUS FOR PERFORMING CONGESTION CONTROL IN NR V2X

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 17/270,807

(22) PCT Filed: Sep. 30, 2019

(86) PCT No.: PCT/KR2019/012756
§ 371 (c)(1),
(2) Date: Feb. 23, 2021

(87) PCT Pub. No.: WO2020/067842
PCT Pub. Date: Apr. 2, 2020

(65) Prior Publication Data
US 2021/0337426 A1    Oct. 28, 2021

Related U.S. Application Data

(60) Provisional application No. 62/739,108, filed on Sep. 28, 2018.

(51) Int. Cl.
*H04W 28/02* (2009.01)
*H04B 7/0413* (2017.01)
(Continued)

(52) U.S. Cl.
CPC ...... *H04W 28/0289* (2013.01); *H04B 7/0413* (2013.01); *H04W 4/40* (2018.02); *H04W 72/52* (2023.01); *H04W 74/0816* (2013.01)

(58) Field of Classification Search
None
See application file for complete search history.

(56) References Cited

U.S. PATENT DOCUMENTS

2015/0156662 A1    6/2015  Bai et al.
2018/0048577 A1*   2/2018  Gulati .............. H04W 28/0236
(Continued)

FOREIGN PATENT DOCUMENTS

| KR | 1020170091051 | 8/2017 |
|----|---------------|--------|
| KR | 1020180099750 | 9/2018 |
| WO | 2017176098    | 10/2017 |

OTHER PUBLICATIONS

3GPP TS 36.133 v15.3.0, 3GPP; TSGRAN, E-UTRA; Requirement for support of radio resource management (Release 15), Jul. 9, 2018, see sections 12.1-13.6.

*Primary Examiner* — Diane L Lo
(74) *Attorney, Agent, or Firm* — BRYAN CAVE LEIGHTON PAISNER LLP

(57) ABSTRACT

Provided are a method for performing sidelink communication by means of a first device (100), and an apparatus supporting same. The method comprises the steps of: performing channel occupancy ratio (CR) measurement on the basis of the number of transmission layers; and performing sidelink communication on the basis of the measurement.

13 Claims, 36 Drawing Sheets

(51) Int. Cl.
  *H04W 4/40* (2018.01)
  *H04W 72/52* (2023.01)
  *H04W 74/08* (2009.01)
  *H04W 74/0816* (2024.01)

(56) References Cited

U.S. PATENT DOCUMENTS

2019/0313279 A1* 10/2019 Li ......................... H04W 72/12
2020/0029245 A1* 1/2020 Khoryaev ............. H04W 36/22
2021/0329596 A1* 10/2021 Freda .................. H04W 72/541

* cited by examiner

FIG. 12
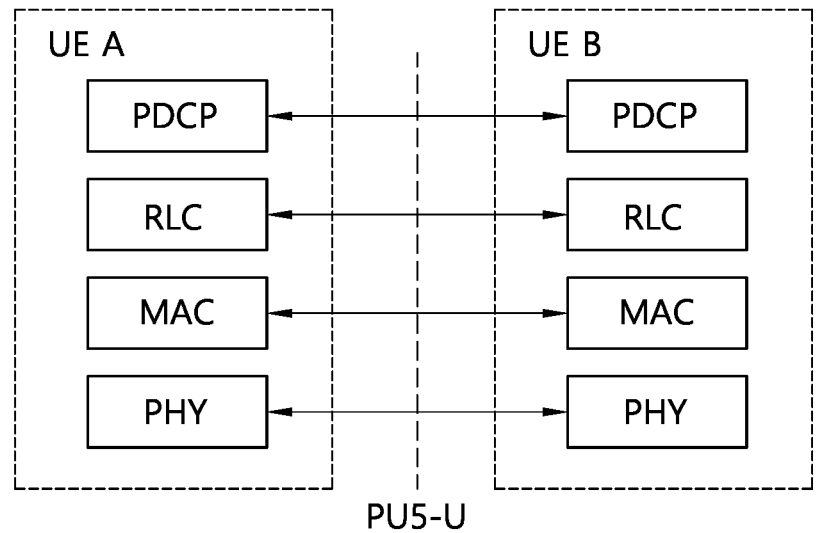
(a)
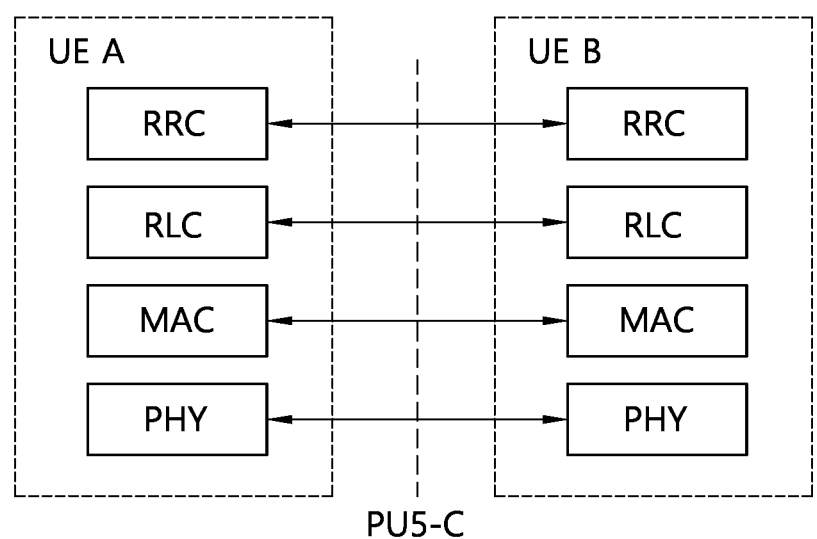
(b)

FIG. 13
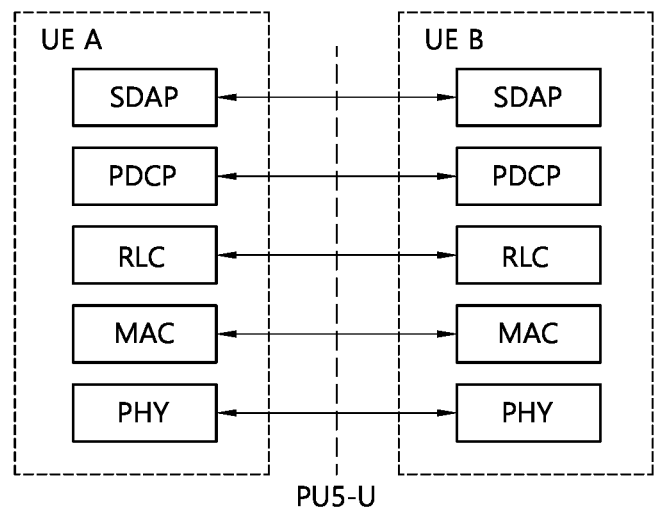
(a)
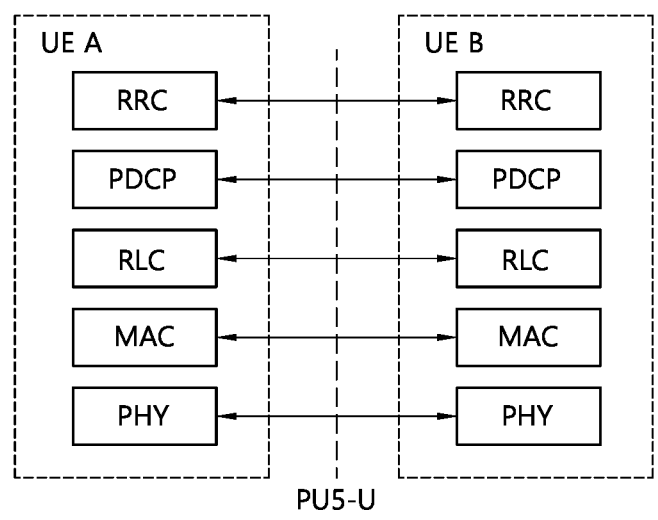
(b)

METHOD AND APPARATUS FOR PERFORMING CONGESTION CONTROL IN NR V2X

This application is the National Stage filing under 35 U.S.C. 371 of International Application No. PCT/KR2019/012756, filed on Sep. 30, 2019, which claims the benefit of U.S. Provisional Application No. 62/739,108 filed on Sep. 28, 2018, the contents of which are all hereby incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in SL communication or V2X communication, a UE needs to perform sidelink congestion control in consideration of the number of transport layers.

Technical Solutions

In an embodiment, a method for performing, by a first device (100), sidelink communication is provided. The method may comprise: performing a channel occupancy ratio (CR) measurement based on a number of transport layers; and performing the sidelink communication based on the measurement.

In another embodiment, a method for performing, by a first device (100), sidelink transmission is provided. The method may comprise: measuring a channel busy ratio (CBR); and performing the sidelink transmission based on a rank value that is less than or equal to a rank value related to the measured CBR.

In another embodiment, a first device (100) performing sidelink communication is provided. The first device (100) may comprise: one or more memories; one or more transceivers; and one or more processors connected to the one or more memories and the one or more transceivers. The one or more processors may be configured to: perform a channel occupancy ratio (CR) measurement based on a number of transport layers; and perform the sidelink communication based on the measurement.

Effects of the Disclosure

A user equipment (UE) may efficiently perform sidelink communication.

BRIEF DESCRIPTION OF THE DRAWINGS

FIG. 12 shows a protocol stack for a SL communication, in accordance with an embodiment of the present disclosure.

FIG. 13 shows a protocol stack for a SL communication, in accordance with an embodiment of the present disclosure.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
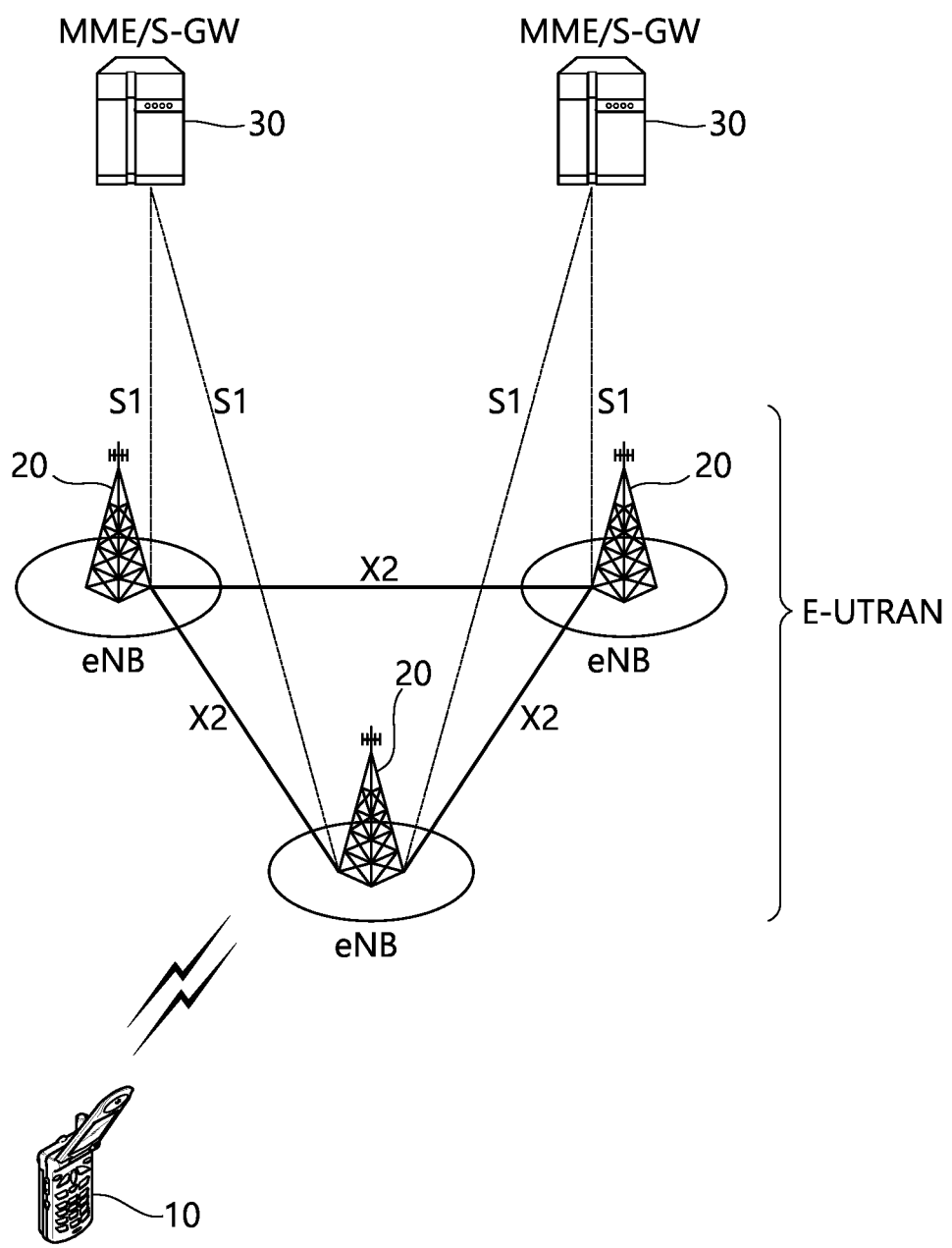
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
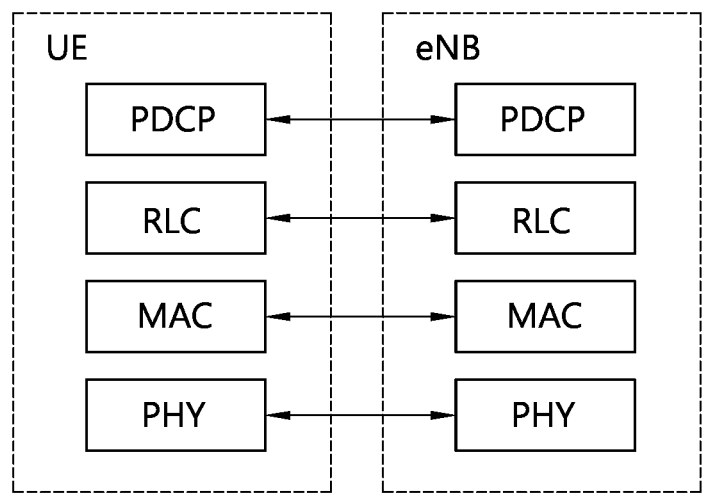
FIG. 2 shows a radio protocol architecture of a user plane, in accordance with an embodiment of the present disclosure.
Figure 3:
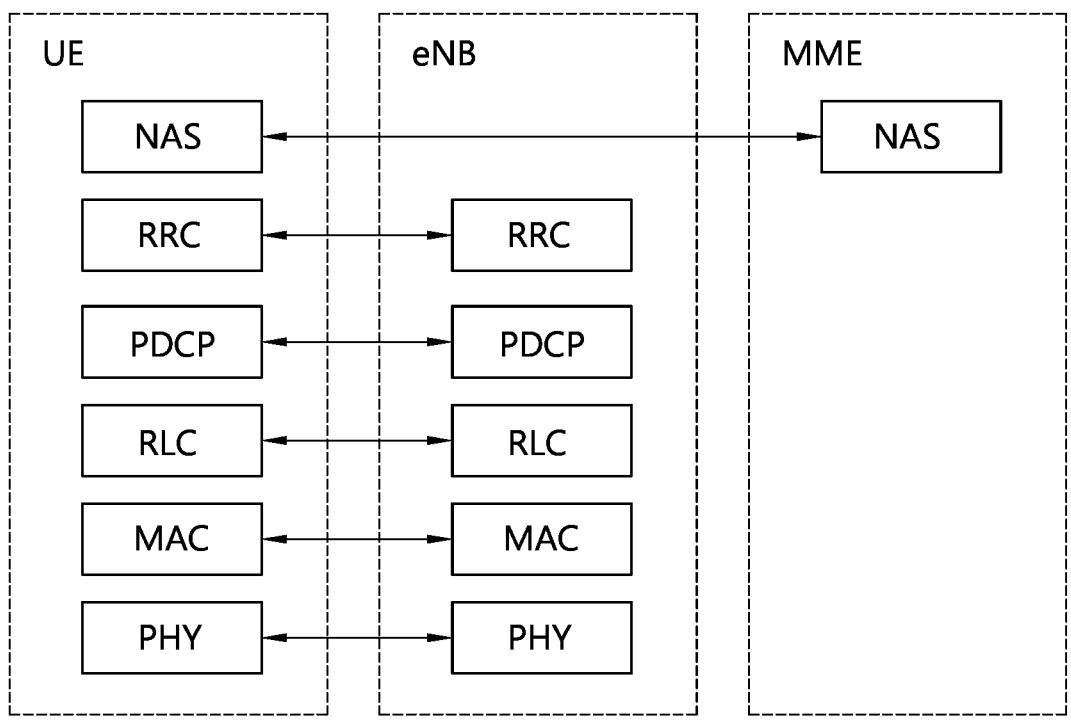
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data.

Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
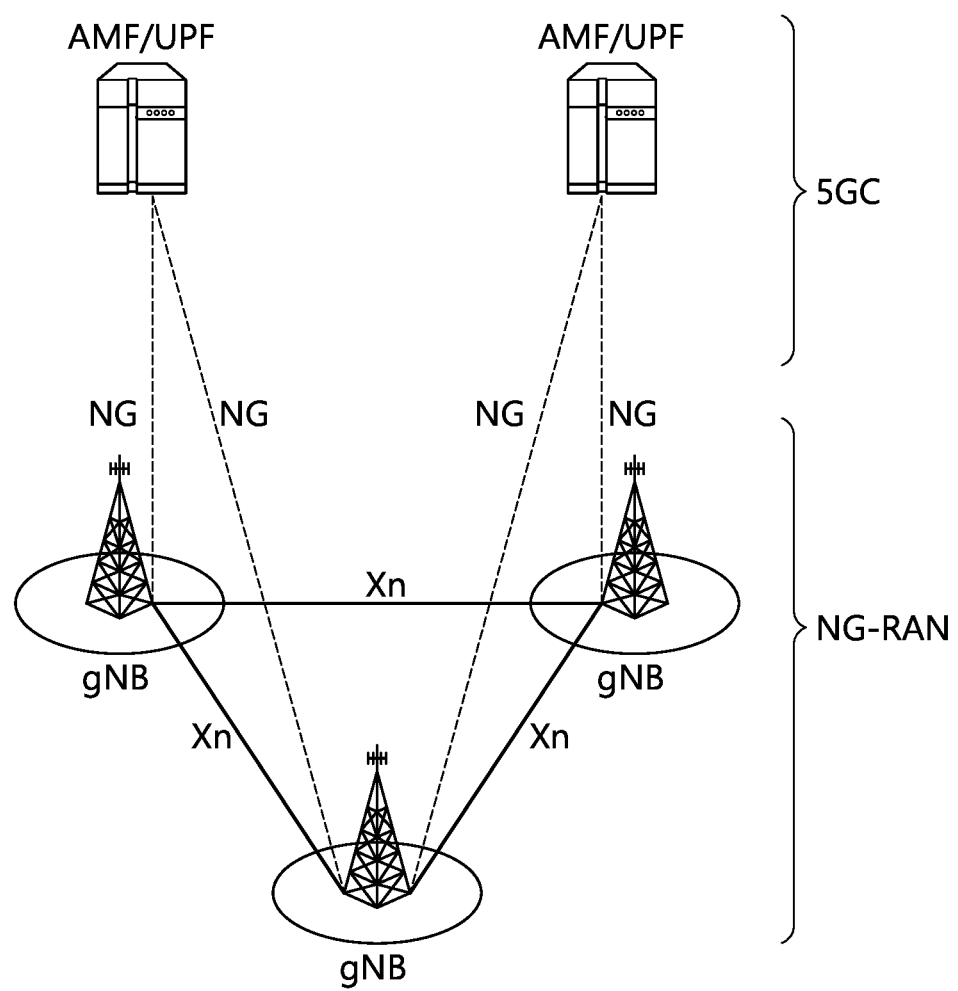
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
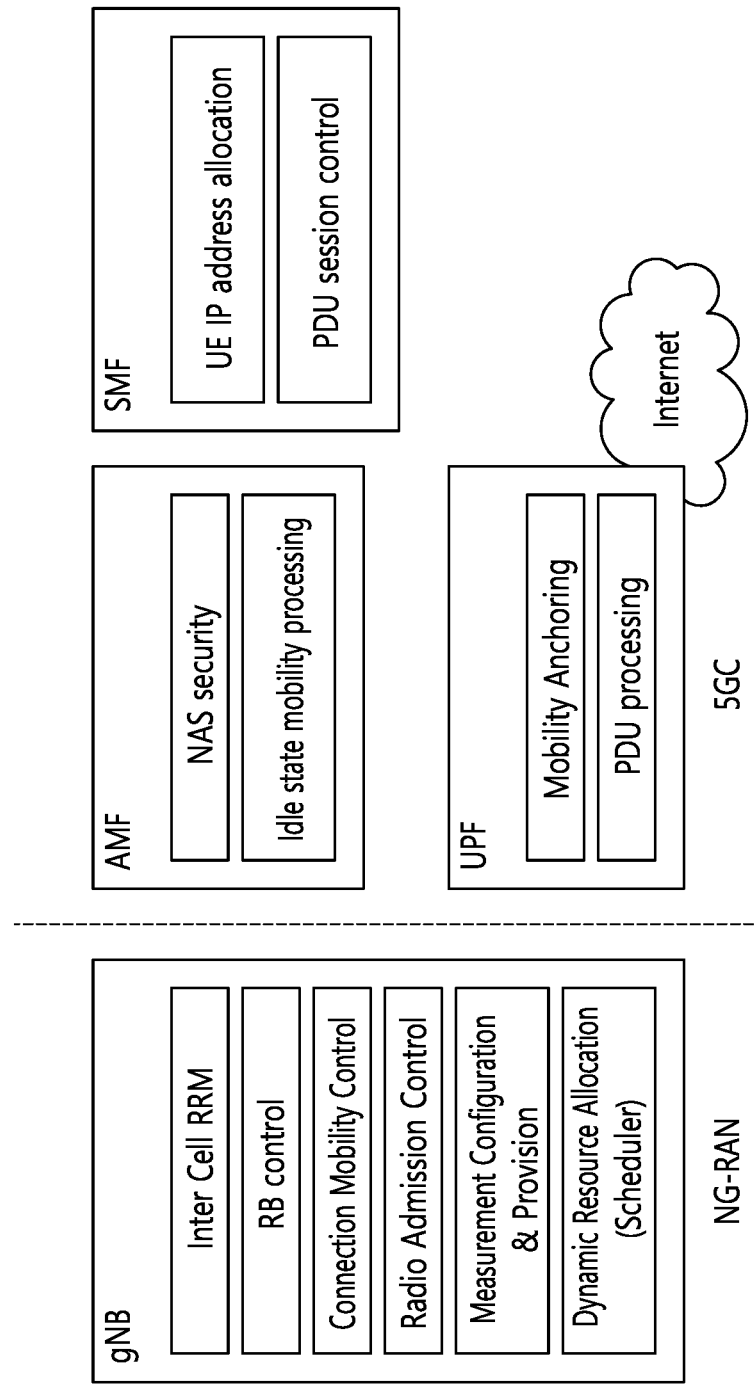
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
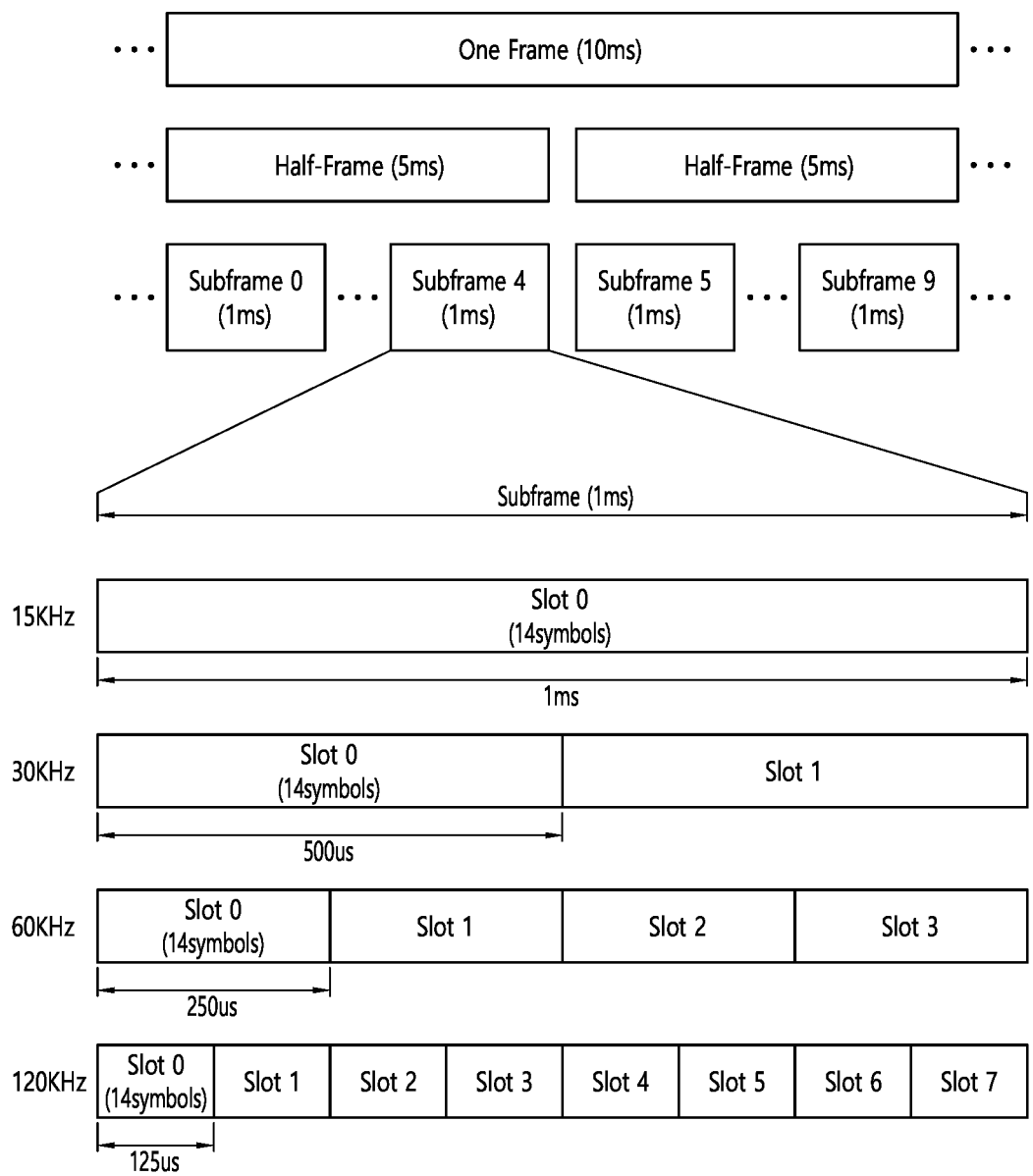
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
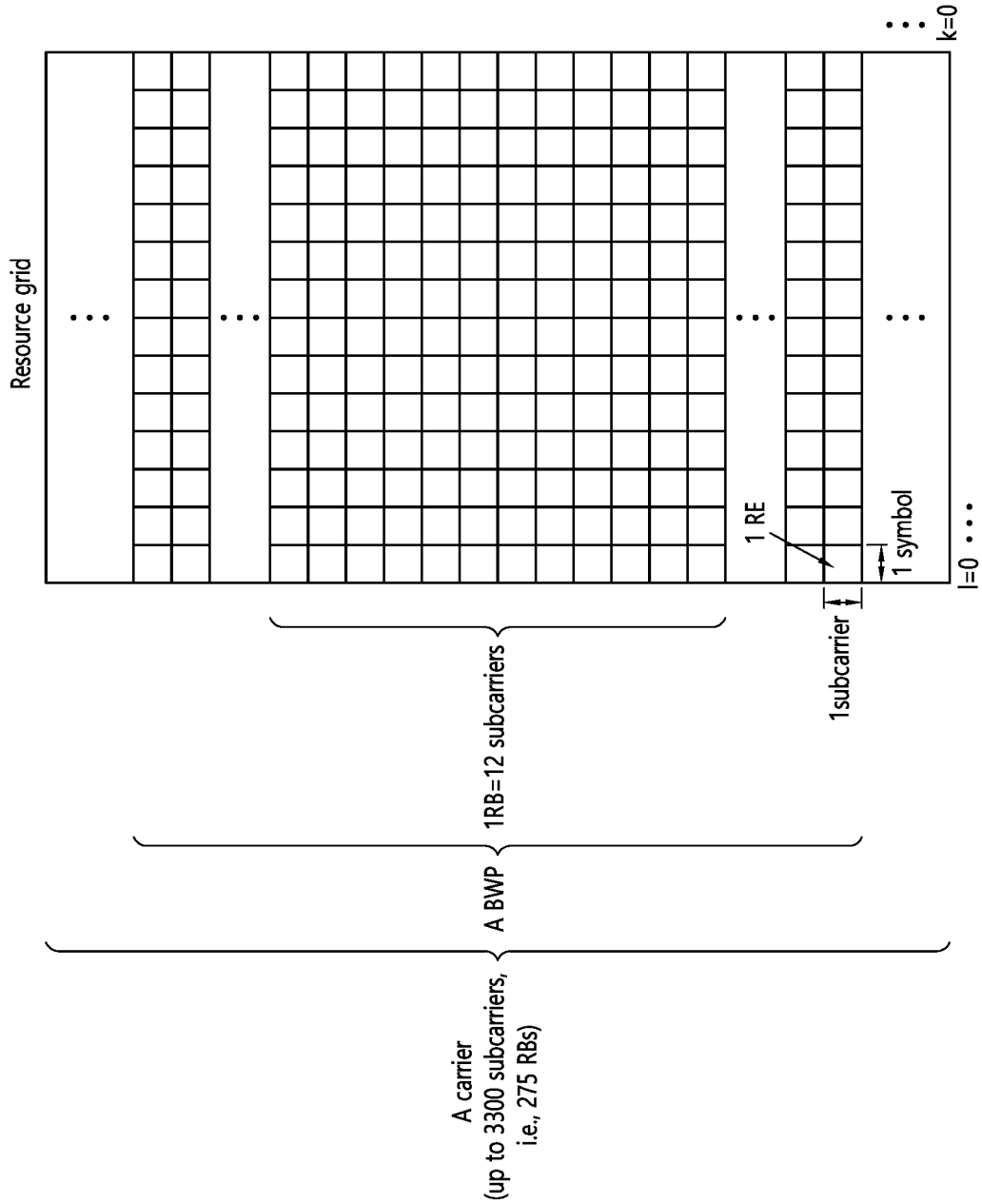
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
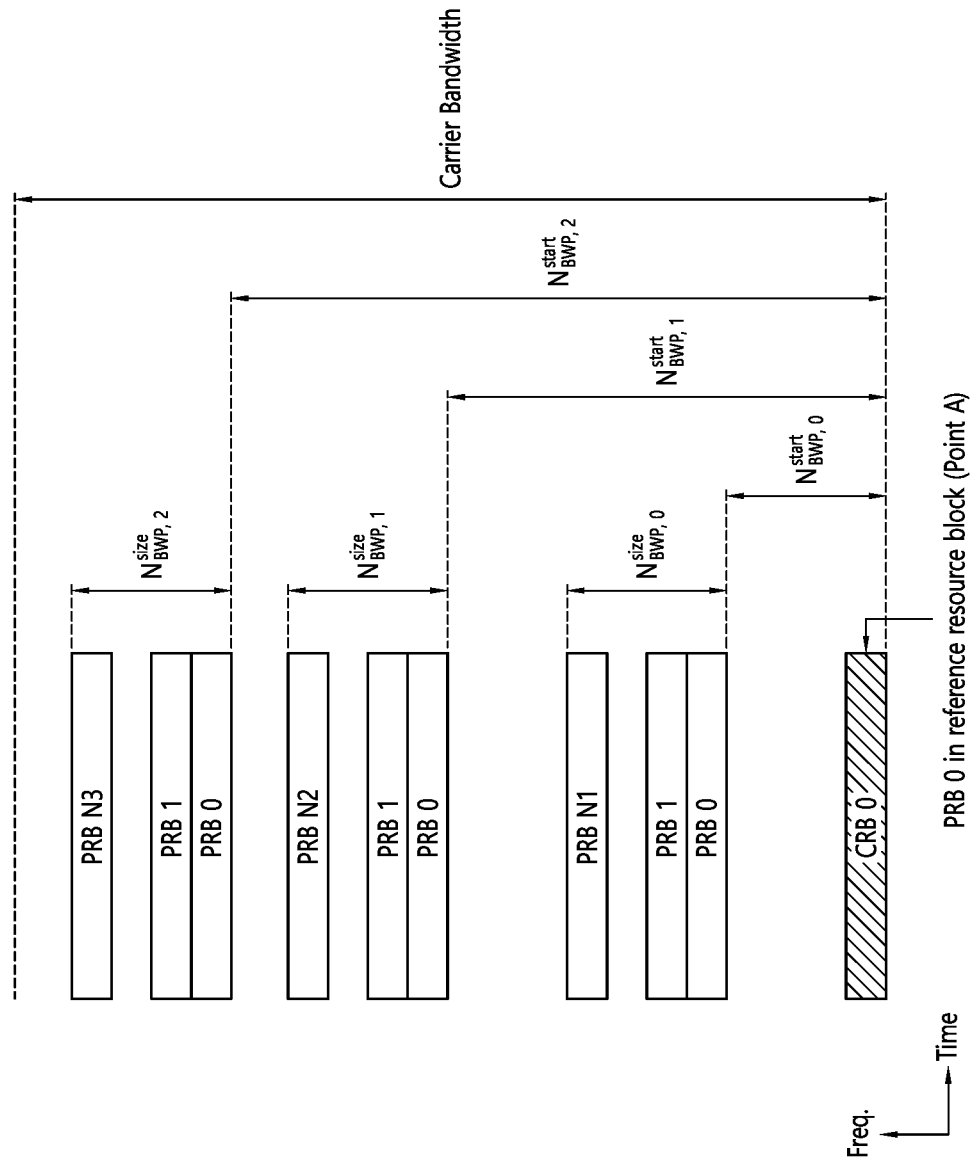
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, beamforming will be described.

Beamforming technology using multiple antennas may be broadly divided into analog beamforming technology (hereinafter, "analog beamforming") and digital beamforming technology (hereinafter, "digital beamforming") depending on where a beamforming weight vector or precoding vector is applied.

Figure 9:
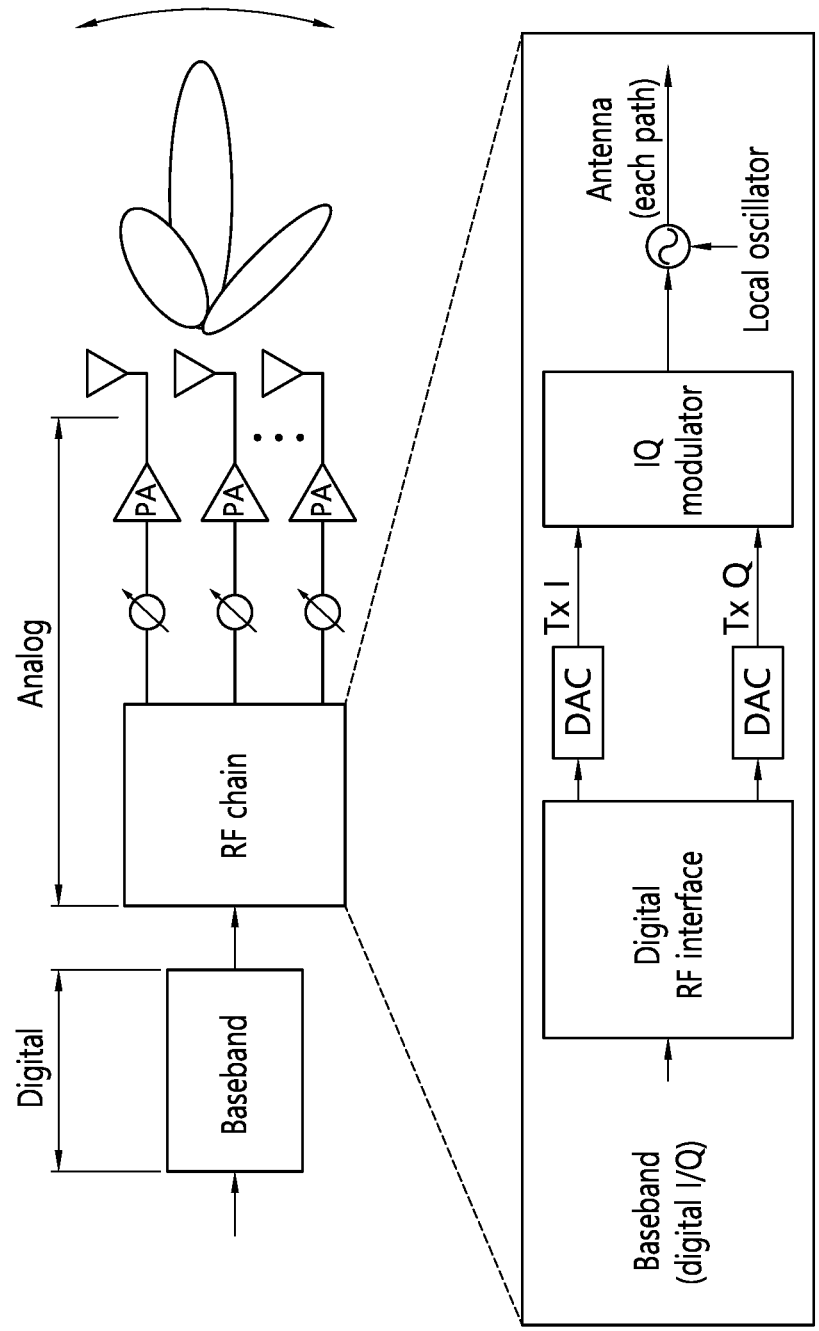
FIG. 9 shows an analog beamforming, in accordance with an embodiment of the present disclosure.

FIG. 9 shows an analog beamforming, in accordance with an embodiment of the present disclosure.

Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 9, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 10:
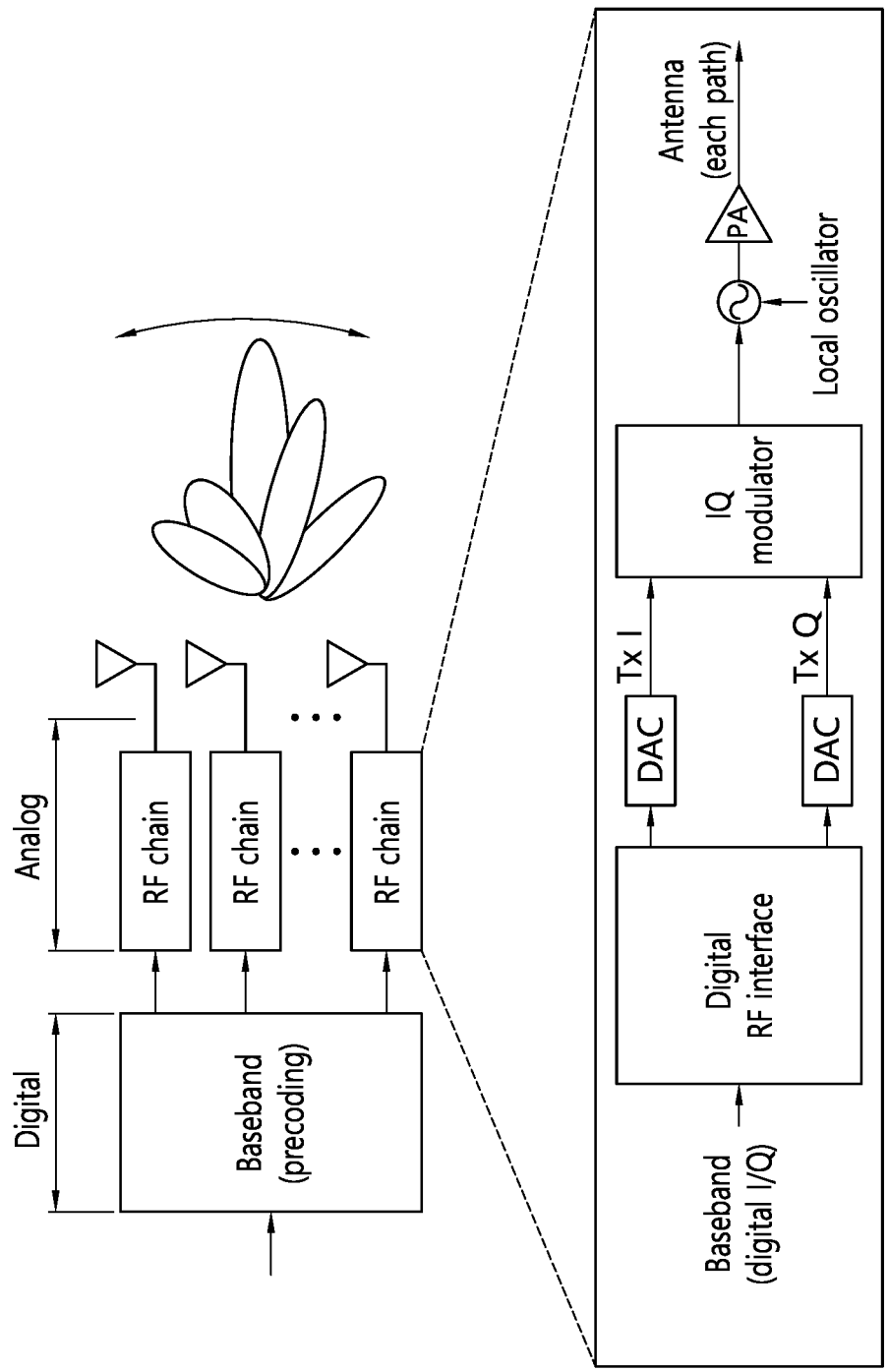
FIG. 10 shows a digital beamforming, in accordance with an embodiment of the present disclosure.

FIG. 10 shows a digital beamforming, in accordance with an embodiment of the present disclosure.

In digital beamforming, as opposed to analog beamforming, a beam is formed in the digital stage by a baseband process, in order to maximize diversity and multiplexing gain in an MIMO environment. Referring to FIG. 10, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO- OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Figure 11:
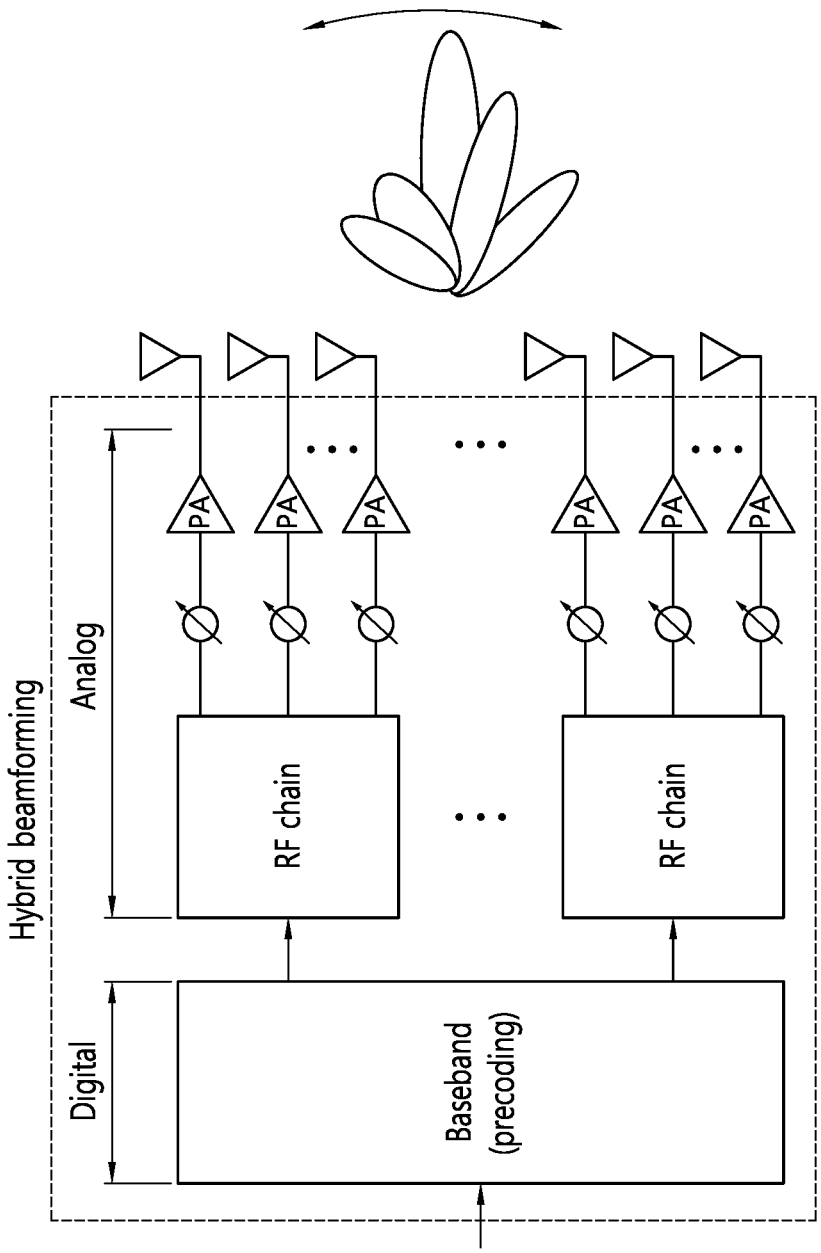
FIG. 11 shows a hybrid beamforming, in accordance with an embodiment of the present disclosure.

FIG. 11 shows a hybrid beamforming, in accordance with an embodiment of the present disclosure.

As described above, the hybrid beamforming is aimed at configuring a transmitting end capable of taking advantage of the advantages of analog beamforming and digital beamforming in a large MIMO environment. Referring to FIG. 11, hybrid beamforming basically forms a coarse beam through analog beamforming and forms a beam for multiple streams or multi-user transmission through digital beamforming. That is, the hybrid beamforming may have a structure for simultaneously taking the analog beamforming and the digital beamforming in order to lower the implementation complexity or the hardware complexity of the transmitting end.

In order to achieve a high data rate, the Millimeter Wave (mmW) band is being considered in the new RAT. Since the microwave band has a short wavelength, a plurality of antennas can be installed in the same area. For example, since the wavelength is 1 cm in the 30 GHz band, a total of 100 antenna elements can be installed at 0.5-lambda intervals and as a 2-dimension array on a panel having a breath of 5 cm and a length of 5 cm. If multiple antenna elements are used in the very high frequency band, the coverage can be increased and the throughput can be improved by the increase of the beamforming gain.

Hereinafter, V2X or SL communication will be described.

FIG. 12 shows a protocol stack for a SL communication, in accordance with an embodiment of the present disclosure. More specifically, (a) of FIG. 12 shows a user plane protocol stack of LTE, and (b) of FIG. 12 shows a control plane protocol stack of LTE.

FIG. 13 shows a protocol stack for a SL communication, in accordance with an embodiment of the present disclosure. More specifically, (a) of FIG. 13 shows a user plane protocol stack of NR, and (b) of FIG. 13 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may correspond to value being used by a network, and values from 168 to 335 may correspond to value being used outside of the network coverage.

Figure 14:
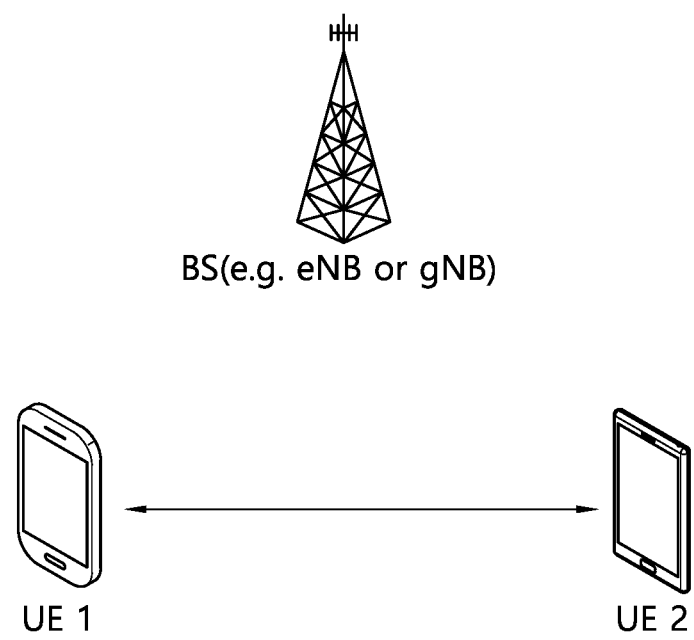
FIG. 14 shows a UE performing V2X or SL communication, in accordance with an embodiment of the present disclosure.

FIG. 14 shows a UE performing V2X or SL communication, in accordance with an embodiment of the present disclosure.

Referring to FIG. 14, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 15:
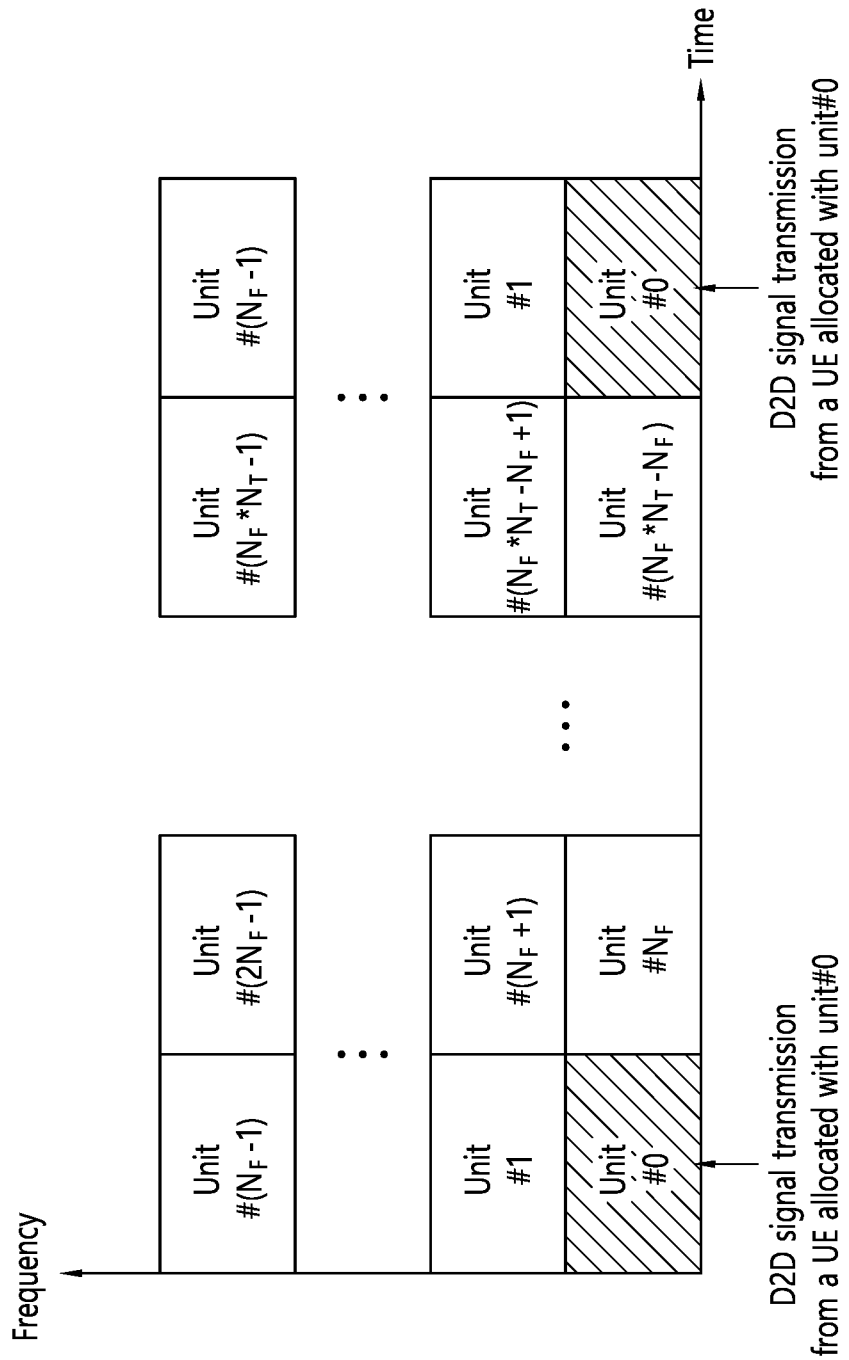
FIG. 15 shows a resource unit for V2X or SL communication, in accordance with an embodiment of the present disclosure.

FIG. 15 shows a resource unit for V2X or SL communication, in accordance with an embodiment of the present disclosure.

Referring to FIG. 15, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 15 shows an example of a case where the corresponding resource pool is repeated at a cycle of $N_T$ number of subframes.

As shown in FIG. 15, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may correspond to a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 16:
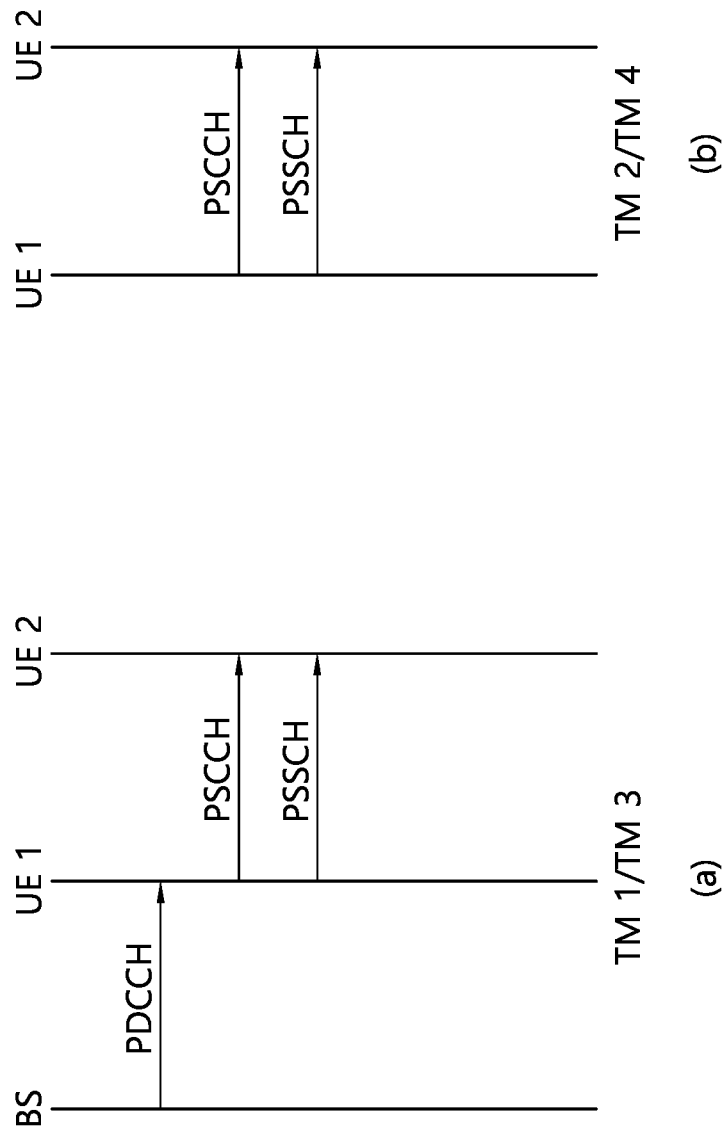
FIG. 16 shows procedures of a UE performing V2X or SL communication according to a transmission mode (TM), in accordance with an embodiment of the present disclosure.

FIG. 16 shows procedures of a UE performing V2X or SL communication according to a transmission mode (TM), in accordance with an embodiment of the present disclosure. Specifically, (a) of FIG. 16 shows a UE operation related to a transmission mode 1 or a transmission mode 3, and (b) of FIG. 16 shows a UE operation related to a transmission mode 2 or a transmission mode 4.

Referring to (a) of FIG. 16, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 16, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 17:
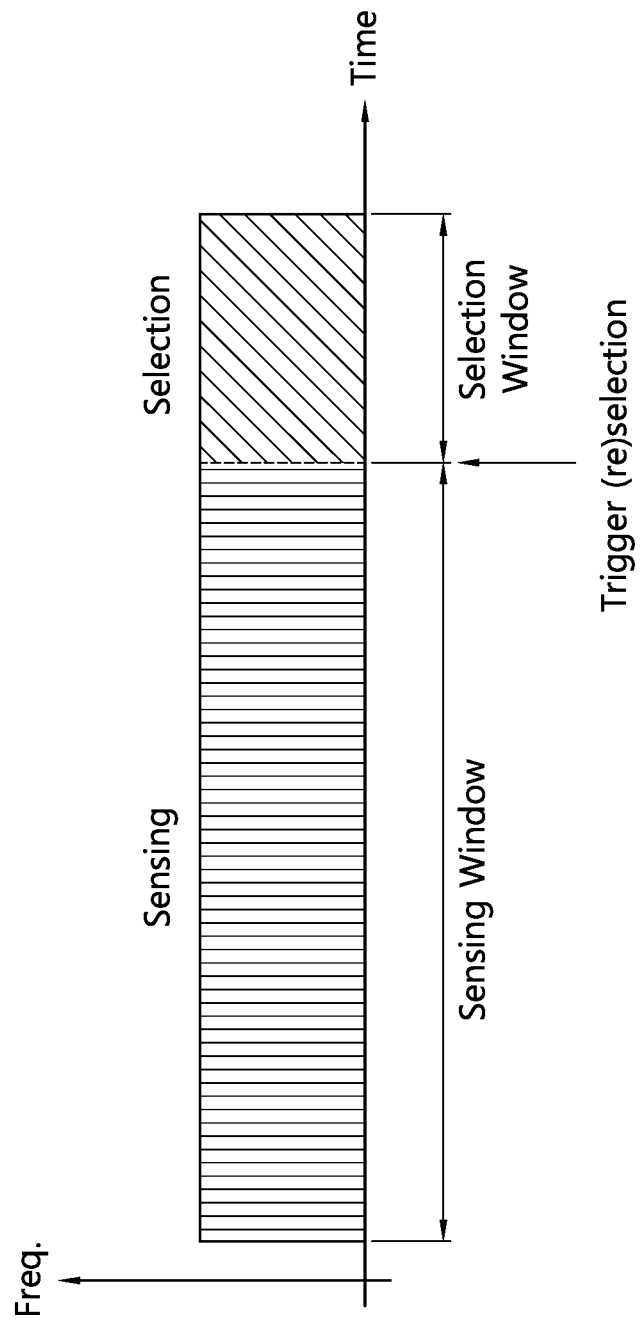
FIG. 17 shows a method of selecting a transmission resource by a UE, in accordance with an embodiment of the present disclosure.

FIG. 17 shows a method of selecting a transmission resource by a UE, in accordance with an embodiment of the present disclosure.

Referring to FIG. 17, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Hereinafter, SL congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In this specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In this specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 18:
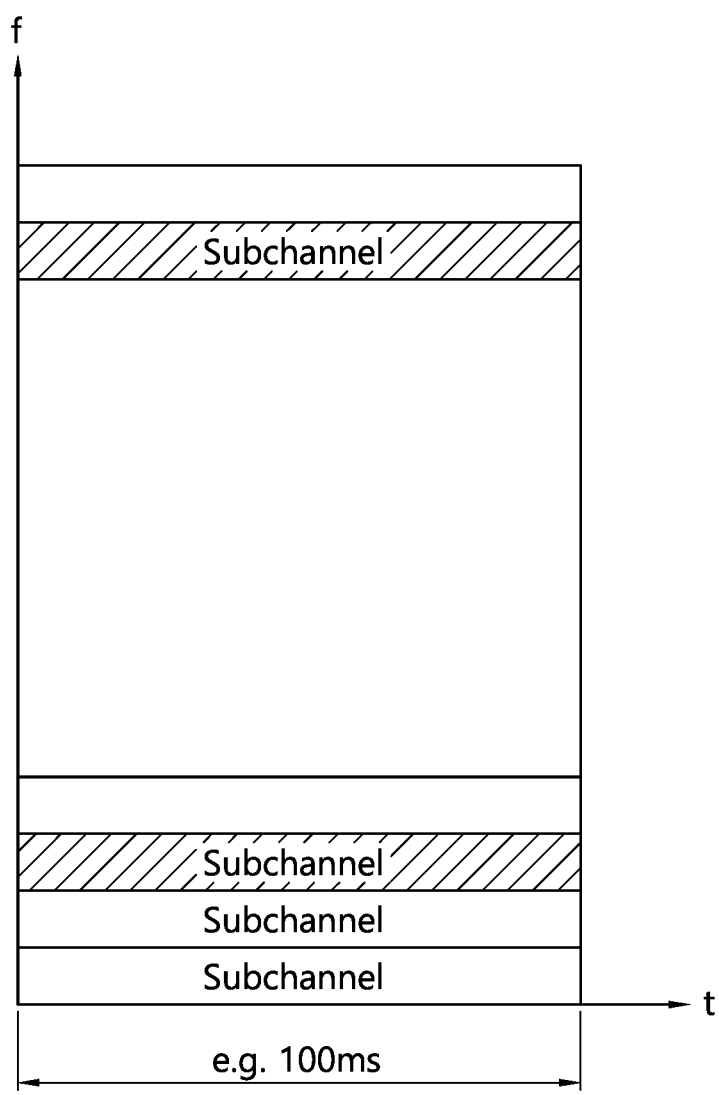
FIG. 18 shows a method for a UE to measure channel busy ratio (CBR), in accordance with an embodiment of the present disclosure.

FIG. 18 shows a method for a UE to measure channel busy ratio (CBR), in accordance with an embodiment of the present disclosure.

Referring to FIG. 18, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 18, if it is assumed that a hatched sub-channel is a sub-channel having a value greater than or equal to a pre-configured threshold, the CBR may denote a ratio of the hatched sub-channels for a period of 100 ms.

Further, congestion control considering a priority of traffic (e.g., packet) may be necessary. To this end, for example, the UE may measure a channel occupancy ratio (CR). Specifically, the UE may measure the CBR, and the UE may determine a maximum value (CRlimitk) of a channel occupancy ratio k (CRk) that can be occupied by traffic corresponding to each priority (e.g., k) based on the CBR. For example, the UE may derive the maximum value (CRlimitk) of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Meanwhile, in an NR system, the UE may receive information on a slot format. For example, an in-coverage UE may receive subcarrier spacing and TDD DL/UL patterns from the base station. The TDD DL/UL pattern may include a DL/UL transmission cycle, a number of consecutive DL slots, a number of consecutive DL symbols, a number of consecutive UL slots, and a number of consecutive UL symbols. In this case, the UE can know that the slot format is the same as FIG. 19 based on the information on the slot format.

Figure 19:
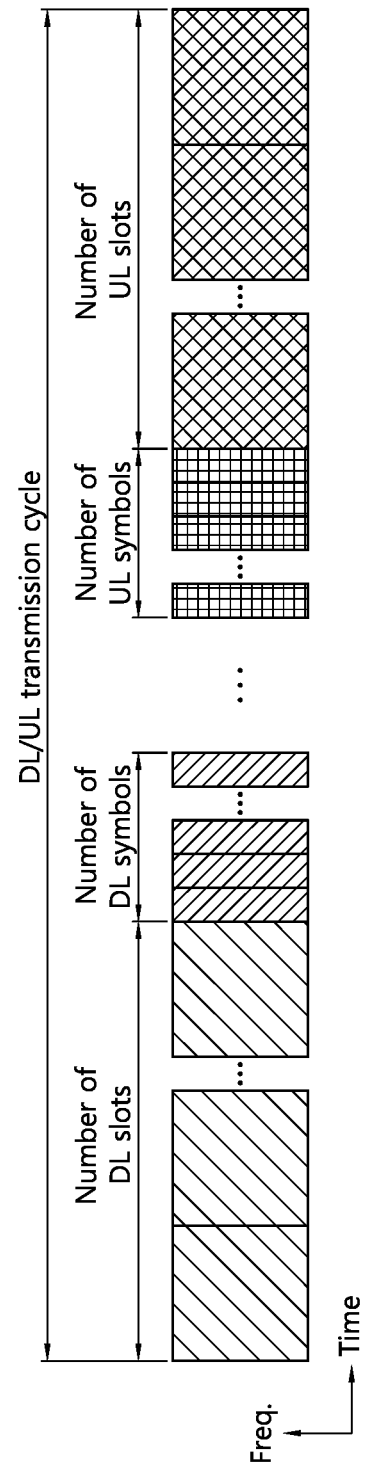
FIG. 19 shows an example of a slot format, in accordance with an embodiment of the present disclosure.

FIG. 19 shows an example of a slot format, in accordance with an embodiment of the present disclosure.

As shown in the embodiment of FIG. 19, in case of an NR system, a flexible slot format may be configured. Therefore, for example, in case of an NR system, a number of symbols configuring each of the UL/DL/FLEXIBLE resources within a slot may be configured to be partly or entirely different between slots or BWPs.

Therefore, for example, under an in-coverage environment, in case a V2X resource pool is configured for (part of) UL resources, the number of symbols within a SL slot (configuring the V2X resource pool) may be different among the slots. Additionally, for example, in case a V2X resource pool is configured under an out-of-coverage environment, the number of symbols within a SL slot may be different among the slots. For example, in case a V2X resource pool is configured under an out-of-coverage environment without considering UL resources, the number of symbols within a SL slot may be different among the slots. For example, depending upon which SL slot is being selected among the UEs, even if a UE uses only one subchannel, the (actual) number of resources being used may be different.

In this specification, a SL slot may include at least one of a slot in which a UE is capable of performing sidelink communication, a slot in which a UE is capable of performing V2X communication, a slot having a resource pool for sidelink configured therein, and/or a slot having a resource pool for V2X configured therein. In this specification, a SL symbol may include at least one of a slot in which a UE is capable of performing sidelink communication, a slot in which a UE is capable of performing V2X communication, a symbol being related to sidelink communication, and/or a symbol being related to sidelink. For example, a SL symbol may include at least one of a UL symbol and/or a FLEXIBLE (F) symbol.

For example, in case that multiple transmitting UEs select and/or adjust a number of symbols (e.g., a number of transmission symbols or a number of SL symbols) within each SL slot based on service types related to transmission messages, requirements (e.g., reliability and/or latency), target coverage, and/or waveforms related to transmission channels, and so on, even if each of the multiple transmitting UEs uses one subchannel within the (same) SL slot(s), the (actual) number of resources being used by the multiple UEs may be different among the multiple UEs.

For example, in case that multiple transmitting UEs select a numerology (e.g., subcarrier spacing) based on service types related to transmission messages, requirements, target coverage, and/or waveforms related to transmission channels, and so on, a number of transmissions being performed by the multiple UEs within a given time (e.g., 1 ms) may be different among the multiple UEs. Alternatively, for example, in case that multiple transmitting UEs select a numerology (e.g., subcarrier spacing) based on service types related to transmission messages, requirements, target coverage, and/or waveforms related to transmission channels, and so on, a number of resources being used by the multiple UEs within a given time (e.g., 1 ms) may be different among the multiple UEs.

As described above, even if the multiple UEs use one subchannel within an SL slot or within the same slot, the number of resources being used by the multiple UEs, the number of transmissions being performed by the multiple UEs within a given time, and/or the number of resources being used by the multiple UEs within a given time may be different among the multiple UEs. Accordingly, in the aspect of multiple UEs, a method for fairly or efficiently performing CR and/or CBR measurement may be needed.

Hereinafter, according to various embodiments of the present disclosure, a method for performing, by a UE, CR measurement and/or CBR measurement based on a resource unit and a device for supporting the same will be described.

In this specification, a sidelink RSSI may be defined as the linear average of the total received power (in [W]) per SC-FDMA symbol observed by the UE only in the configured subchannel in SC-FDMA symbols 1, 2, . . . , 6 of the first slot and SC-FDMA symbols 0, 1, . . . , 5 of the second slot of a subframe. In this specification, a PSSCH Reference Signal Received Power (PSSCH-RSRP) may be defined as the linear average over the power contributions (in [W]) of the resource elements that carry demodulation reference signals related with PSSCH, within the PRBs indicated by the associated PSCCH.

In this specification, receiving operations of a UE may include decoding operations and/or receiving operations of a sidelink channel and/or sidelink signal (e.g., PSCCH, PSSCH, PSFCH, PSBCH, PSSS/SSSS, and so on). Receiving operations of a UE may include decoding operations and/or receiving operations of a WAN DL channel and/or a WAN DL signal (e.g., PDCCH, PDSCH, PSS/SSS, and so on). Receiving operations of a UE may include sensing operations and/or CBR measurement operations. In this specification, sensing operations of a UE may include a PSSCH-RSRP measurement operation based on a PSSCH DM-RS sequence, a PSSCH-RSRP measurement operation based on a PSSCH DM-RS sequence, which is scheduled by a PSCCH that is successfully decoded by the UE, a sidelink RSSI (S-RSSI) measurement operation, and/or a S-RSSI measurement operation based on a subchannel related with a V2X resource pool. In this specification, transmitting operations of the UE may include transmitting operations of a sidelink channel and/or sidelink signal (e.g., PSCCH, PSSCH, PSFCH, PSBCH, PSSS/SSSS, and so on). Transmitting operations of the UE may include transmitting operations of a WAN UL channel and/or a WAN UL signal (e.g., PUSCH, PUCCH, SRS, and so on). In this specification, a synchronization signal may include a SLSS and/or PSBCH.

In this specification, when the same or different messages are transmitted through a plurality of antenna panels (or a beam, or a transceiver unit, or a unit having an analog beam adjustment-related phase shifter and amplifier, or an antenna element) to which partially or entirely different antenna port (AP) indices are mapped, such a transmission type may be interpreted or regarded as a sort of multi-layer transmission type. In this specification, when the same or different messages are transmitted through a plurality of antenna panels (or a beam or an antenna element) to which the same AP index is mapped, such a transmission type may be interpreted or regarded as a sort of single-layer transmission type.

In this specification, for example, a beam, an antenna panel, an AP, a transceiver unit, and/or an antenna element may be interpreted mutually in an extended or crossed manner. For example, the AP may include at least any one of an AP at a baseband end, an AP related to a digital beam, an AP at an RF end, and/or an AP related to an analog beam. For example, the beam may include a set of beams, the antenna panel may include a set of antenna panels, the transceiver unit may include a set of transceiver units, and the antenna element may include a set of antenna elements. For example, the antenna panel may be a unit consisting of at least any one of (pre-configured) one or a plurality of beams, (pre-configured) one or a plurality of APs, (pre-configured) one or a plurality of transceiver units, and/or (pre-configured) one or a plurality of antenna elements.

In this specification, configuration may include signaling, signaling from a network, configuration from a network, and/or a pre-configuration from a network. In this specification, definition may include signaling, signaling from a network, configuration from a network, and/or a pre-configuration from a network. In this specification, designation may include signaling, signaling from a network, configuration from a network, and/or a pre-configuration from a network. In this specification, ProSe Per Packet Priority (PPPP) may be replaced with ProSe Per Packet Reliability (PPPR), and PPPR may be replaced with PPPP. In this specification, as the PPPP value becomes smaller, this may indicate a high priority level, and, as the PPPP value becomes greater, this may indicate a low priority level. In this specification, as the PPPP value becomes smaller, this may indicate a high reliability level, and, as the PPPP value becomes greater, this may indicate a low reliability level.

Part or all of the method proposed in this specification may be limited to transmitting operation, transmission carrier selecting operation, and/or transmission BWP selecting operation of a UE. Alternatively, for example, part or all of the method proposed in this specification may be limited to receiving operation, reception carrier selecting operation, and/or reception BWP selecting operation of a UE.

At least one of the proposed methods proposed in this specification may not only be applied to sidelink communication or V2X communication based on a PC5 interface or a SL interface (e.g., PSCCH, PSSCH, PSBCH, PSSS/SSSS, and so on) but may also be applied to sidelink communication or V2X communication based on a Uu interface (e.g., PUSCH, PDSCH, PDCCH, PUCCH, and so on).

Figure 20:
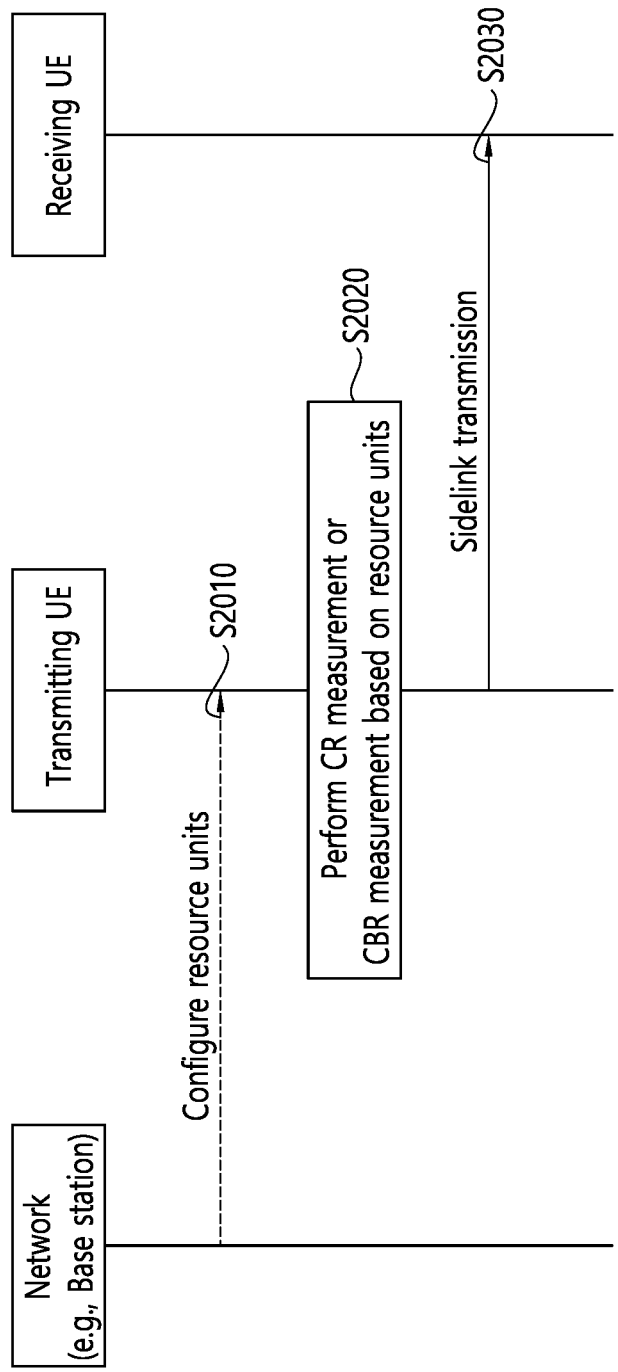
FIG. 20 shows a method for performing, by a UE, CR measurement or CBR measurement based on a basic resource unit, in accordance with an embodiment of the present disclosure.

FIG. 20 shows a method for performing, by a UE, CR measurement or CBR measurement based on a basic resource unit, in accordance with an embodiment of the present disclosure.

Referring to FIG. 20, in step S2010, the UE may receive configurations for a basic resource unit from a network (e.g., base station). For example, the basic resource unit may be configured or pre-configured for the UE. For example, the basic resource unit may be used in CR measurement and/or CBR measurement. For example, the basic resource unit may be configured in time and/or frequency units. For example, the basic resource unit may include one or more symbols and one or more subcarriers. Alternatively, for example, a basic resource unit and/or a basic numerology (e.g., subcarrier spacing) that is to be used in CR measurement and/or CBR measurement may be configured or pre-configured for the UE. Alternatively, for example, a basic resource unit and/or a basic numerology (e.g., subcarrier spacing) that is to be used in CR measurement and/or CBR measurement may be pre-defined for the UE.

In this specification, for simplicity in the description, the basic resource unit and/or the basic numerology may be referred to as BASIC_CUN. Herein, for example, BASIC_CUN may be independently or differently configured in accordance with a V2X resource pool, a BWP, a service type, a PPPP, a PPPR, and/or a numerology.

Figure 21:
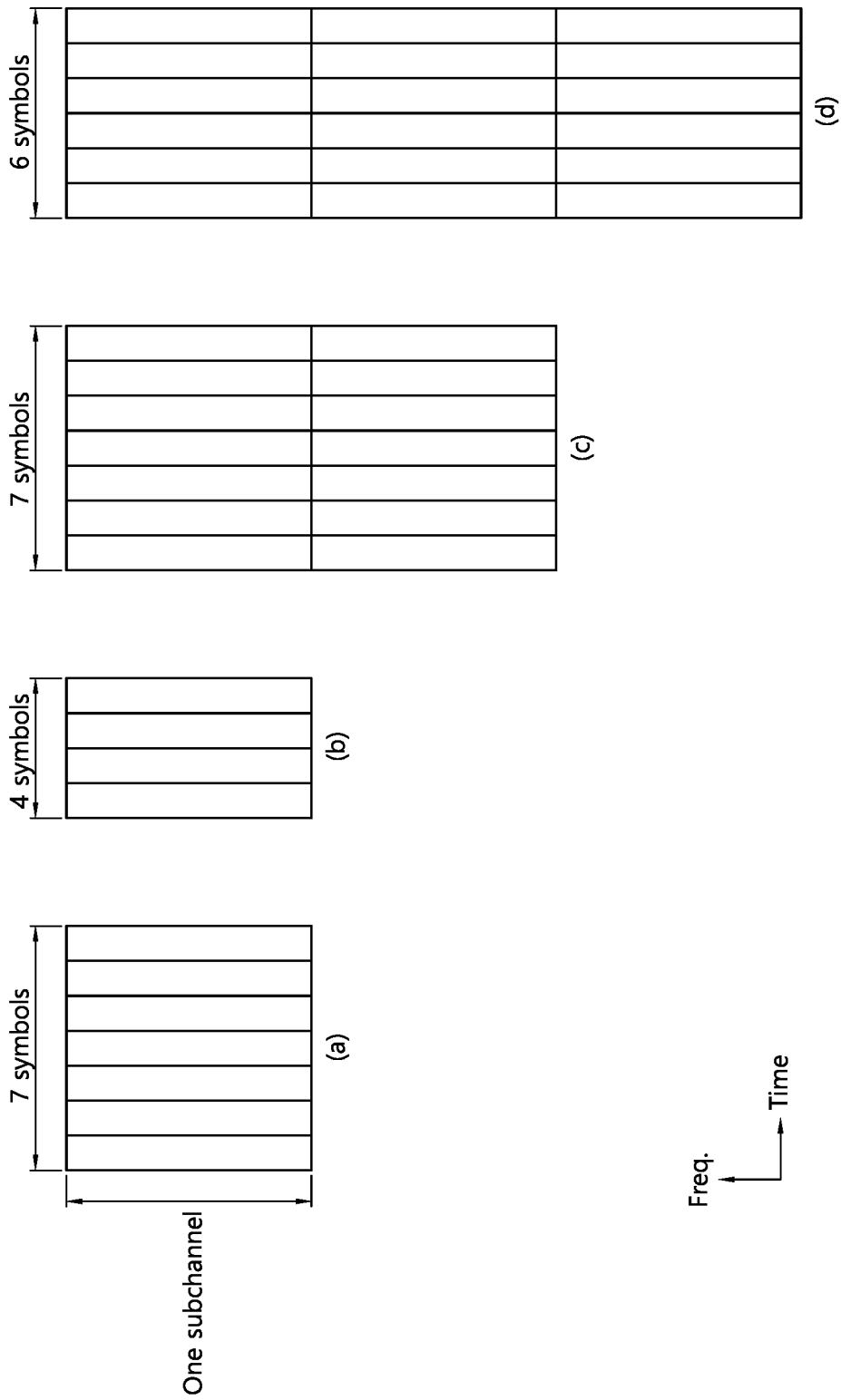
FIG. 21 shows an example of a basic resource unit, in accordance with an embodiment of the present disclosure.

FIG. 21 shows an example of a basic resource unit, in accordance with an embodiment of the present disclosure.

Referring to (a) of FIG. 21, BASIC_CUN may be configured as one subchannel being comprised of 7 symbols. For example, BASIC_CUN may be configured as one subchannel including 7 symbols. Referring to (b) of FIG. 21, BASIC_CUN may be configured as one subchannel being comprised of 4 symbols. For example, BASIC_CUN may be configured as one subchannel including 4 symbols. Referring to (c) of FIG. 21, BASIC_CUN may be configured as two subchannels each being comprised of 7 symbols. For example, BASIC_CUN may be configured as two subchannels each including 7 symbols. Referring to (d) of FIG. 21, BASIC_CUN may be configured as three subchannels each comprised configured of 6 symbols. For example, BASIC_CUN may be configured as three subchannels each including 6 symbols. The embodiments of FIG. 21 are merely exemplary, and, therefore, the BASIC_CUN may be configured or defined by other various methods.

For example, BASIC_CUN may be configured as a smallest amount (or number) of (time and/or frequency) resource units that may be selected for SL transmission within a V2X resource pool. For example, BASIC_CUN may be configured as a largest amount (or number) of (time and/or frequency) resource units that may be selected for SL transmission within a V2X resource pool.

For example, BASIC_CUN may be configured as a smallest amount (or number) of (time and/or frequency) resource units and/or a largest numerology (e.g., subcarrier spacing) that may be selected for SL transmission within a V2X resource pool. For example, BASIC_CUN may be configured as a smallest amount (or number) of (time and/or frequency) resource units and/or a smallest numerology (e.g., subcarrier spacing) that may be selected for SL transmission within a V2X resource pool. For example, BASIC_CUN may be configured as a largest amount (or number) of (time and/or frequency) resource units and/or a largest numerology (e.g., subcarrier spacing) that may be selected for SL transmission within a V2X resource pool. For example, BASIC_CUN may be configured as a largest amount (or number) of (time and/or frequency) resource units and/or a smallest numerology (e.g., subcarrier spacing) that may be selected for SL transmission within a V2X resource pool.

For example, BASIC_CUN may be configured as a subchannel on a SL slot being comprised of a smallest number of symbols. For example, BASIC_CUN may be configured as a subchannel on a SL slot being comprised of a largest number of symbols. For example, BASIC_CUN may be configured as a subchannel having a smallest number of symbols. For example, BASIC_CUN may be configured as a subchannel having a largest number of symbols.

For example, BASIC_CUN may be configured as (frequency) resources in (a pre-defined number of) SL slot units. Herein, for example, in case the corresponding rule is applied, SL transmission using one or more subchannels among SL slots having different numbers of symbols or SL transmission using one or more subchannels having different numbers of symbols may not be differentiated in the aspect of CR measurement and/or CBR measurement.

Figure 22:
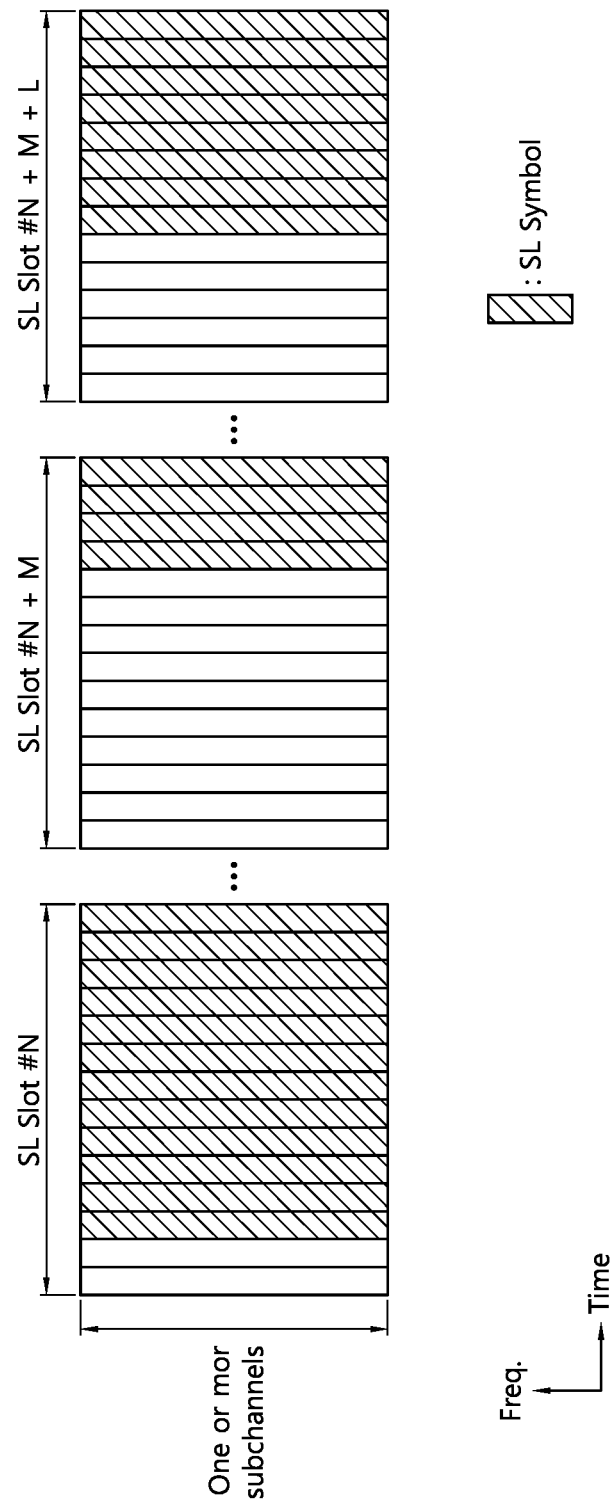
FIG. 22 shows an example of a basic resource unit being configured, in accordance with an embodiment of the present disclosure.

FIG. 22 shows an example of a basic resource unit being configured, in accordance with an embodiment of the present disclosure.

Referring to FIG. 22, it is assumed that a V2X resource pool includes SL slot #N, SL slot #N+M and SL slot #N+M+L. Additionally, it is also assumed that SL slot #N includes 12 SL symbols, and that SL slot #N+M includes 4 SL symbols, and that SL slot #N+M+L includes 8 sidelink symbols.

In this case, for example, in case BASIC_CUN is configured as a smallest amount (or number) of resource units that may be selected for SL transmission within a V2X resource pool, BASIC_CUN may be configured based on a slot having the smallest number of SL symbols. For example, in the embodiment of FIG. 22, based on SL slot #N+M, BASIC_CUN may be configured as one or more subcarriers including 4 symbols.

Alternatively, for example, in case BASIC_CUN is configured as a largest amount (or number) of resource units that may be selected for SL transmission within a V2X resource pool, BASIC_CUN may be configured based on a slot having the largest number of SL symbols. For example, in the embodiment of FIG. 22, based on SL slot #N, BASIC_CUN may be configured as one or more subcarriers including 12 symbols.

Referring back to FIG. 20, in step S2020, the UE may perform CR measurement and/or CBR measurement based on BASIC_CUN. In addition, in step S2030, the UE may perform sidelink transmission. For example, the sidelink transmission may be performed by using resource that are selected and/or occupied in accordance with the CR measurement and/or CBR measurement.

For example, in case of LTE V2X or LTE SL, the UE performed CR measurement and/or CBR measurement in subframe units. In case of LTE, since one entire subframe was used for the sidelink communication, no problem occurred even if the UE performed CR measurement and/or CBR measurement in subframe units.

However, in case of NR V2X or NR SL, due to a flexible slot format, instead of all symbols, only part of the symbols within a slot may be used for the sidelink communication. Even though only part of the symbols within a slot may be used for the sidelink communication, performing CR measurement and/or CBR measurement in all symbol units configuring the slot by the multiple UE may cause unfairness among the multiple UEs. For example, it will be assumed that a first UE may use 4 symbols in a first slot for sidelink communication and that a second UE may use 8 symbols in a second slot for sidelink communication. In this case, when the first UE and the second UE perform CR measurement and/or CBR measurement in units of 14 symbols, even though the second UE is capable of performing sidelink communication by using a larger number of resources as compared to the first UE, the CR measurement and/or CBR measurement may be performed according to a same reference standard. Alternatively, if a first UE performs CR measurement and/or CBR measurement in units of 4 symbols, and if a second UE performs CR measurement and/or CBR measurement in units of 8 symbols, even though the second UE is capable of performing sidelink communication by using a larger number of resources as compared to the first UE, the CR measurement and/or CBR measurement may be performed according to a same reference standard. This may act as a disadvantage in light of the first UE.

Conversely, according to an embodiment of the present disclosure, a UE may be configured of a BASIC_CUN for the CR measurement and/or CBR measurement, and the UE may perform the CR measurement and/or CBR measurement based on the BASIC_CUN. For example, it will be assumed that a first UE may use 4 symbols in a first slot for sidelink communication and that a second UE may use 8 symbols in a second slot for sidelink communication. Additionally, it will be assumed that the BASIC_CUN is a subchannel being configured of 4 symbols. In this case, for example, if the second UE occupies 8 symbols in the second slot, and if the first UE occupies 4 symbols in the first slot, when performing CR measurement, it will be viewed that the second UE occupies resources 2 times in the second slot, and it will be viewed that the first UE occupies resources 1 time in the first slot. Therefore, in case of performing the CR measurement and/or CBR measurement based on the BASIC_CUN, due to the flexible slot format, even though the number of SL symbols configuring the plurality of SL slots are different, the UE may fairly or efficiently perform the CR measurement and/or CBR measurement based on the BASIC_CUN.

Hereinafter, according to an embodiment of the present disclosure, a method of performing, by a UE, CR measurement and/or CBR measurement based on BASIC_CUN will be described in detail.

For example, when the UE performs CR measurement and/or CBR measurement, the UE may apply a value obtained by dividing RSCNM_SL by BASIC_CUN or a value obtained by normalizing RSCNM_SL with BASIC_CUN to the CR measurement and/or CBR measurement. Herein, RSCNM_SL may include at least one of a size (or number) of resource being used within a SL slot, a size (or number) of resource being used for SL transmission within a SL slot, a number of transmissions being performed within a given time, and/or a number of transmissions being performed for SL transmission within a given time. Herein, for example, in case of applying the corresponding rule, in the viewpoint of the CR and/or CBR, one or more subchannels being configured of a relatively larger number of symbols may be interpreted as having high weighted values. For example, in case of applying the corresponding rule, in the viewpoint of the CR and/or CBR, as compared to one or more subchannels being configured of a relatively smaller number of symbols, the weighted values may be interpreted as being relatively high.

Figure 23:
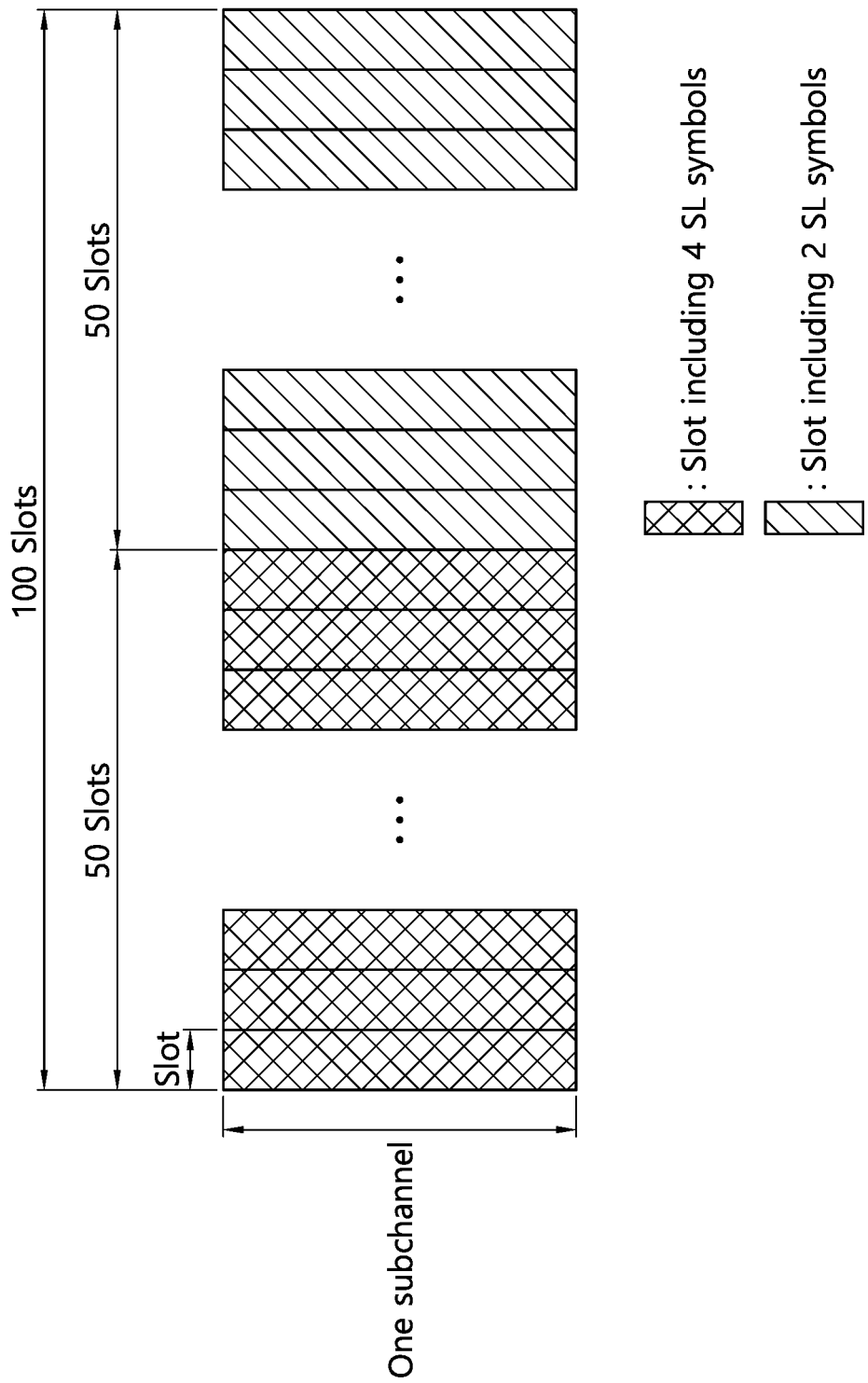
FIG. 23 shows a method for performing, by a UE, CR measurement and/or CRB measurement based on a resource unit, in accordance with an embodiment of the present disclosure.

FIG. 23 shows a method for performing, by a UE, CR measurement and/or CRB measurement based on a resource unit, in accordance with an embodiment of the present disclosure.

For simplicity in the description, in the embodiment of FIG. 23, it will be assumed that BASIC_CUN is configured of one or more symbols and one subchannel. However, this will not limit the technical scope or spirit of the present disclosure, and, as shown in the embodiment of FIG. 21, BASIC_CUN may also be configured of one or more symbols and multiple subchannels. Additionally, in the embodiment of FIG. 23, it will be assumed 50 SL slots each including 4 SL symbols exist and that 50 SL slots each including 2 SL symbols exist.

1) In Case of CR Measurement

It will be assumed that a first UE occupies 10 SL slots each including 4 SL symbols, and it will also be assumed that a second UE occupies 10 SL slots each including 2 SL symbols.

For example, when the UE calculates a CR value, a value of the denominator may be changed in accordance with the number of symbols configuring the BASIC_CUN. For example, in case the first UE calculates the CR value based on the BASIC_CUN, which is configured of 2 symbols and one subchannel, the CR value may be calculated as 13.33% (=20/150). For example, in case the second UE calculates the CR value based on the BASIC_CUN, which is configured of 2 symbols and one subchannel, the CR value may be calculated as 6.67% (=10/150). For example, in case the BASIC_CUN is configured as a subchannel being configured of 2 symbols, and if the UE uses a subchannel being configured of 4 symbols, as compared to a case where the UE uses a subchannel being configured of 2 symbols, the CR value may be increased to 2 times. In this case, accuracy in the CR measurement may be more enhanced.

For example, when the UE calculates a CR value, regardless of the number of symbols configuring the BASIC_CUN, the value of the denominator may be determined in accordance with a number of subchannels that may be used in an actual sidelink transmission. For example, in case the first UE calculates a CR value based on the BASIC_CUN, which is configured of 4 symbols and 1 subchannel, and a number of subchannels related with the sidelink, the CR value may be calculated as 10% (=10/100). For example, in case the second UE calculates a CR value based on the BASIC_CUN, which is configured of 4 symbols and 1 subchannel, and a number of subchannels related with the sidelink, the CR value may be calculated as 10% (=10/100). In this case, when performing CR measurement, a level of complexity in the UE embodiment may be decreased.

2) In Case of CBR Measurement 2.1) For example, it will be assumed that a RSSI value, which is measured from 50 SL slots each including 4 SL symbols, exceeds a threshold value.

For example, in case the UE calculates a CBR value based on the BASIC_CUN, which is configured of 2 symbols and 1 subchannel, the CBR value may be calculated as 75% (=100/150). For example, in case the UE calculates a CBR value based on the BASIC_CUN, which is configured of 4 symbols and 1 subchannel, the CBR value may be calculated as 50% (=50/100). In this case, when the UE calculates the CBR value, the value of the denominator may be changed in accordance with the number of symbols configuring the BASIC_CUN.

For example, in case the UE calculates a CBR value based on the BASIC_CUN, which is configured of 2 symbols and 1 subchannel, and a number of subchannels being related with the sidelink, the CBR value may be calculated as 100% (=100/100). Alternatively, for example, in case the UE calculates a CBR value based on the BASIC_CUN, which is configured of 4 symbols and 1 subchannel, and a number of subchannels being related with the sidelink, the CBR value may be calculated as 50% (=50/100). In this case, when the UE calculates a CBR value, regardless of the number of symbols configuring the BASIC_CUN, the value of the denominator may be determined in accordance with a number of subchannels that may be used in an actual sidelink transmission.

2.2) For example, it will be assumed that a RSSI value, which is measured from 25 SL slots each including 4 SL symbols, exceeds a threshold value, and that a RSSI value, which is measured from 25 SL slots each including 2 SL symbols, exceeds a threshold value.

For example, in case the UE calculates a CBR value based on the BASIC_CUN, which is configured of 2 symbols and 1 subchannel, the CBR value may be calculated as 50% (=75/150). Alternatively, for example, in case the UE calculates a CBR value based on the BASIC_CUN, which is configured of 4 symbols and 1 subchannel, the CBR value may be calculated as 50% (=50/100). In this case, when the UE calculates the CBR value, the value of the denominator may be changed in accordance with the number of symbols configuring the BASIC_CUN.

For example, in case the UE calculates a CBR value based on the BASIC_CUN, which is configured of 2 symbols and 1 subchannel, and a number of subchannels being related with the sidelink, the CBR value may be calculated as 75% (=75/100). Alternatively, for example, in case the UE calculates a CBR value based on the BASIC_CUN, which is configured of 4 symbols and 1 subchannel, the CBR value may be calculated as 50% (=50/100). In this case, when the UE calculates a CBR value, regardless of the number of symbols configuring the BASIC_CUN, the value of the denominator may be determined in accordance with a number of subchannels that may be used in an actual sidelink transmission.

For example, in the embodiment of FIG. 23, in case the BASIC_CUN is configured of a subchannel being configured of 2 symbols, when the UE uses a subchannel being configured of 4 symbols, as compared to a case where the UE uses a subchannel being configured of 2 symbols, the CBR value may be increased.

According to an embodiment of the present disclosure, in case a number of SL symbols configuring a slot is partly or fully different, the UE may fairly or efficiently perform the CR measurement and/or CBR measurement based on the BASIC_CUN.

According to an embodiment of the present disclosure, for resources related with transmissions of a pre-configured channel and/or signal, a UE may not perform CR measurement and/or CBR measurement. For example, the UE may exclude resources in which a pre-configured channel and/or signal is/are transmitted from the CR measurement and/or CBR measurement. Herein, for example, since the pre-configured channel and/or signal is/are not used for performing communication of a UE, which transmits the pre-configured channel and/or signal, but is/are used for performing communication (e.g., data re-transmission) of a UE, which receives the pre-configured channel and/or signal, the pre-configured channel and/or signal may be excluded from the CR measurement and/or CBR measurement. Alternatively, for example, the UE may also apply the transmission of the pre-configured channel and/or signal to the CR measurement and/or CBR measurement. However, in this case, a number of BASIC_CUNs or a value of BASIC_CUN to be applied when performing transmission of the pre-configured channel and/or signal may include at least one of the channels and/or signals listed below.

Channel for reporting HARQ-ACK (e.g., information indicating successful or non-successful decoding of the received data), and/or Channel for reporting channel status, and/or Channel for reporting measurement, and/or Channel for reporting measurement related to link quality, and/or Channel for transmitting or relaying a preemption message, and/or Channel related to S-SSB or S-SSB Channel related to transmission of a standalone PSCCH For example, the preemption message may be a message for preempting resources for enabling a UE, which intends to transmit a service or packet having a (relatively) high priority level, to transmit the service or packet having a high priority level. Alternatively, for example, the preemption message may be a message that is used by a UE, which intends to transmit a service or packet having a (relatively) high priority level, to notify another UE, which intends to transmit a service or packet having a (relatively) low priority level, to avoid using the resource for transmitting the service or packet having a high priority level. In this case, for example, in case a UE having received the preemption message has already reserved the corresponding resource, the UE having received the preemption message may trigger resource re-selection. Accordingly, the UE having received the preemption message may re-select another resource. For example, in order to avoid collision in an initial transmission, the standalone PSCCH may include control information for notifying other UEs of resource reservation information for an initial transmission and/or resource reservation information for re-transmission.

According to an exemplary embodiment of the present disclosure, a value of a time duration (or period) or a time length during which the CR measurement and/or CBR measurement is performed may be configured or signaled for the UE. For example, a network may configure or signal a value of a time duration (or period) or a time length during which the CR measurement and/or CBR measurement is performed to a UE. Herein, for example, a value of a time duration (or period) or a time length during which the CR measurement and/or CBR measurement is performed may be partly or fully configured differently among different service types, different priority levels, message generation types (e.g., periodic generation message and/or aperiodic generation message), PPPP, PPPR, and/or numerology (e.g., subcarrier spacing). For example, a value of a time duration (or period) or a time length during which the CR measurement and/or CBR measurement is performed may be configured identically among different service types, different priority levels, message generation types (e.g., periodic generation message and/or aperiodic generation message), PPPP, PPPR, and/or numerology (e.g., subcarrier spacing). For example, for aperiodic traffic, it may be unnecessary for the UE to perform CR measurement and/or CBR measurement during a long time period (or duration). Therefore, for example, a time period during which CR measurement and/or CBR measurement related with an aperiodic message is performed may be configured to be shorter than a time period during which CR measurement and/or CBR measurement related with a periodic message is performed.

For example, a value of the time period (or duration) or time length during which the CR measurement and/or CBR measurement is performed may be differently configured depending upon whether or not messages of different generation types (e.g., periodic generation message and/or aperiodic generation message) co-exist on a V2X resource pool. For example, a value of the time period (or duration) or time length during which the CR measurement and/or CBR measurement is performed may be differently configured depending upon whether or not messages of different generation types (e.g., periodic generation message and/or aperiodic generation message) co-exist on a V2X resource pool.

For example, CR measurement and/or CBR measurement may be independently performed per V2X resource pool and/or BWP. Alternatively, for example, the CR measurement and/or CBR measurement may be performed together on a plurality of pre-configured V2X resource pools or BWPs (e.g., V2X resource pool configured on a BWP of the same carrier).

Figure 24:
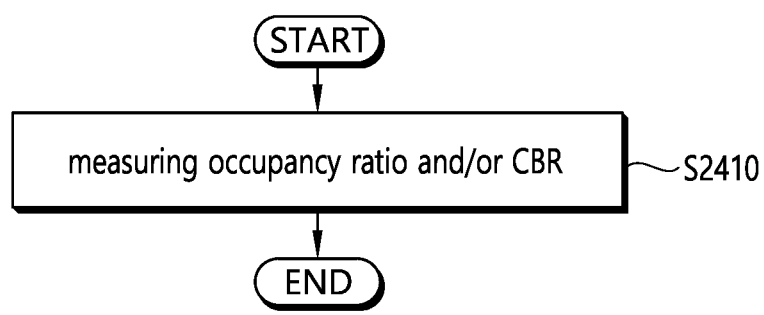
FIG. 24 shows a method for measuring, by a UE, occupancy ratio or CBR, in accordance with an embodiment of the present disclosure.

FIG. 24 shows a method for measuring, by a UE, occupancy ratio or CBR, in accordance with an embodiment of the present disclosure. The embodiment of FIG. 24 may be combined with various embodiments of the present disclosure.

Referring to FIG. 24, in step S2410, the UE may measure occupancy ratio and/or CBR. For example, the UE may calculate occupancy ratio and/or CBR. For example, the UE may obtain occupancy ratio and/or CBR. For example, the occupancy ratio may include at least one of a channel occupancy ratio (CR), a resource usage rate, and/or a resource occupancy rate.

According to an embodiment of the present disclosure, the UE may measure or calculate occupancy ratio based on the number of transport layers. For example, the UE may measure or calculate occupancy ratio based on the number of transmit antenna ports. For example, the UE may measure or calculate occupancy ratio based on a rank value.

For example, in case the UE measures or calculates occupancy ratio, a weight of K times may be applied to K layers-based transmission, compared with one layer-based transmission. For example, compared with one layer-based transmission on the same physical resource, a weight of K times may be applied to K layers-based transmission. For example, a UE performing sidelink communication through K layers may apply a weight of K times to the measured occupancy ratio. For example, it is assumed that occupancy ratio measured by a first UE performing sidelink communication through four layers is 0.2, and that occupancy ratio measured by a second UE performing sidelink communication through one layer is 0.3. Under this assumption, the first UE may determine the occupancy ratio as 0.2*4=0.8, and the second UE may determine the occupancy ratio as 0.3.

For example, in case the UE measures or calculates occupancy ratio, a weight of K times may be applied to K antenna ports-based transmission, compared with one antenna port-based transmission. For example, compared with one antenna port-based transmission on the same physical resource, a weight of K times may be applied to K antenna ports-based transmission. For example, a UE performing sidelink communication through K antenna ports may apply a weight of K times to the measured occupancy ratio. For example, it is assumed that occupancy ratio measured by a first UE performing sidelink communication through four antenna ports is 0.2, and that occupancy ratio measured by a second UE performing sidelink communication through one antenna port is 0.3. Under this assumption, the first UE may determine the occupancy ratio as 0.2*4=0.8, and the second UE may determine the occupancy ratio as 0.3.

For example, in case the UE measures or calculates occupancy rate, a weight of K times may be applied to K ranks-based transmission, compared with one rank-based transmission. For example, compared with one rank-based transmission on the same physical resource, a weight of K times may be applied to K ranks-based transmission. For example, a UE performing sidelink communication through K ranks may apply a weight of K times to the measured occupancy ratio.

For example, in case the UE measures or calculates occupancy ratio, a pre-configured weight may be applied to K layers-based transmission, compared with one layer-based transmission. For example, compared with one layer-based transmission on the same physical resource, a pre-configured weight may be applied to K layers-based transmission. For example, a UE performing sidelink communication through K layers may apply a pre-configured weight to the measured occupancy ratio. For example, a pre-configured weight may be K/2. For example, it is assumed that occupancy ratio measured by a first UE performing sidelink communication through four layers is 0.2, and that occupancy ratio measured by a second UE performing sidelink communication through one layer is 0.3. Further, it is assumed that a pre-configured weight is K/2. Under this assumption, the first UE may determine the occupancy ratio as 0.2*4/2=0.4, and the second UE may determine the occupancy ratio as 0.3. In the above embodiment, it is only one embodiment that the pre-configured weight is assumed to be K/2, and the pre-configured weight is not limited to the embodiment.

For example, in case the UE measures or calculates occupancy ratio, a pre-configured weight may be applied to K antenna ports-based transmission, compared with one antenna port-based transmission. For example, compared with one antenna port-based transmission on the same physical resource, a pre-configured weight may be applied to K antenna ports-based transmission. For example, a UE performing sidelink communication through K antenna ports may apply a pre-configured weight to the measured occupancy ratio. For example, a pre-configured weight may be K/3. For example, it is assumed that occupancy ratio measured by a first UE performing sidelink communication through four antenna ports is 0.2, and that occupancy ratio measured by a second UE performing sidelink communication through one antenna port is 0.3. Further, it is assumed that a pre-configured weight is K/3. Under this assumption, the first UE may determine the occupancy ratio as 0.2*4/3=0.267, and the second UE may determine the occupancy ratio as 0.3. In the above embodiment, it is only one embodiment that the pre-configured weight is assumed to be K/3, and the pre-configured weight is not limited to the embodiment.

For example, in case the UE measures or calculates occupancy ratio, a pre-configured weight may be applied to K ranks-based transmission, compared with one rank-based transmission. For example, compared with one rank-based transmission on the same physical resource, a pre-configured weight may be applied to K ranks-based transmission. For example, a UE performing sidelink communication through K ranks may apply a pre-configured weight to the measured occupancy ratio.

According to an embodiment of the present disclosure, the UE may measure or calculate CBR based on the number of transport layers. For example, the UE may measure or calculate CBR based on the number of transmit antenna ports. For example, the UE may measure or calculate CBR based on a rank value.

For example, in case the UE measures or calculates CBR, a weight of K times may be applied to K layers-based transmission, compared with one layer-based transmission. For example, compared with one layer-based transmission on the same physical resource, a weight of K times may be applied to K layers-based transmission. For example, a UE performing sidelink communication through K layers may apply a weight of K times to the measured CBR. For example, it is assumed that CBR measured by a first UE performing sidelink communication through four layers is 0.2, and that CBR measured by a second UE performing sidelink communication through one layer is 0.3. Under this assumption, the first UE may determine the CBR as 0.2*4=0.8, and the second UE may determine the CBR as 0.3.

For example, in case the UE measures or calculates CBR, a weight of K times may be applied to K antenna ports-based transmission, compared with one antenna port-based transmission. For example, compared with one antenna port-based transmission on the same physical resource, a weight of K times may be applied to K antenna ports-based transmission. For example, a UE performing sidelink communication through K antenna ports may apply a weight of K times to the measured CBR. For example, it is assumed that CBR measured by a first UE performing sidelink communication through four antenna ports is 0.2, and that CBR measured by a second UE performing sidelink communication through one antenna port is 0.3. Under this assumption, the first UE may determine the CBR as 0.2*4=0.8, and the second UE may determine the CBR as 0.3.

For example, in case the UE measures or calculates CBR, a weight of K times may be applied to K ranks-based transmission, compared with one rank-based transmission. For example, compared with one rank-based transmission on the same physical resource, a weight of K times may be applied to K ranks-based transmission. For example, a UE performing sidelink communication through K ranks may apply a weight of K times to the measured CBR.

For example, in case the UE measures or calculates CBR, a pre-configured weight may be applied to K layers-based transmission, compared with one layer-based transmission. For example, compared with one layer-based transmission on the same physical resource, a pre-configured weight may be applied to K layers-based transmission. For example, a UE performing sidelink communication through K layers may apply a pre-configured weight to the measured CBR. For example, a pre-configured weight may be K/2. For example, it is assumed that CBR measured by a first UE performing sidelink communication through four layers is 0.2, and that CBR measured by a second UE performing sidelink communication through one layer is 0.3. Further, it is assumed that a pre-configured weight is K/2. Under this assumption, the first UE may determine the CBR as 0.2*4/2=0.4, and the second UE may determine the CBR as 0.3. In the above embodiment, it is only one embodiment that the pre-configured weight is assumed to be K/2, and the pre-configured weight is not limited to the embodiment.

For example, in case the UE measures or calculates CBR, a pre-configured weight may be applied to K antenna ports-based transmission, compared with one antenna port-based transmission. For example, compared with one antenna port-based transmission on the same physical resource, a pre-configured weight may be applied to K antenna ports-based transmission. For example, a UE performing sidelink communication through K antenna ports may apply a pre-configured weight to the measured CBR. For example, a pre-configured weight may be K/3. For example, it is assumed that CBR measured by a first UE performing sidelink communication through four antenna ports is 0.2, and that CBR measured by a second UE performing sidelink communication through one antenna port is 0.3. Further, it is assumed that a pre-configured weight is K/3. Under this assumption, the first UE may determine the CBR as 0.2*4/3=0.267, and the second UE may determine the CBR as 0.3. In the above embodiment, it is only one embodiment that the pre-configured weight is assumed to be K/3, and the pre-configured weight is not limited to the embodiment.

For example, in case the UE measures or calculates CBR, a pre-configured weight may be applied to K ranks-based transmission, compared with one rank-based transmission. For example, compared with one rank-based transmission on the same physical resource, a pre-configured weight may be applied to K ranks-based transmission. For example, a UE performing sidelink communication through K ranks may apply a pre-configured weight to the measured CBR.

For example, the weight may be configured per a V2X resource pool, per a BWP, per a service type, per a service-related PPPP, per a service-related PPPR, and/or per a numerology, independently or differently. For example, the pre-configured weight may be configured per a V2X resource pool, per a BWP, per a service type, per a service-related PPPP, per a service-related PPPR, and/or per a numerology, independently or differently.

For example, compared with a UE performing sidelink communication using a relatively small number of layers or antenna ports, there may be a high probability that more interference is caused by a UE performing sidelink communication using a relatively large number of layers or antenna ports. In addition, a UE performing sidelink communication using a relatively large number of layers or antenna ports may be considered to use more resources in the spatial domain, compared with a UE performing sidelink communication using a relatively small number of layers or antenna ports. Therefore, according to various embodiments of the present disclosure, by assigning a weight to occupancy ratio and/or CBR in consideration of the number of layers or antenna ports used by the UE, occupancy ratio and/or CBR measurement can be performed fairly between a plurality of UEs.

According to an embodiment of the present disclosure, in case the UE measures or calculates occupancy ratio and/or CBR, it may be assumed that K layers-based transmission is the same as one layer-based transmission. For example, it may be assumed that K antenna ports-based transmission is the same as one antenna port-based transmission. For example, it may be assumed that K ranks-based transmission is the same as one rank-based transmission.

For example, in case the UE measures or calculates occupancy ratio, the number of transport layers may not be considered in measuring or calculating occupancy ratio. For example, in case the UE measures or calculates occupancy ratio, the number of transmit antenna ports may not be considered in measuring or calculating occupancy ratio. For example, in case the UE measures or calculates occupancy ratio, a rank value used for transmission may not be considered in measuring or calculating occupancy ratio.

For example, in case the UE measures or calculates CBR, the number of transport layers may not be considered in measuring or calculating occupancy ratio. For example, in case the UE measures or calculates CBR, the number of transmit antenna ports may not be considered in measuring or calculating occupancy ratio. For example, in case the UE measures or calculates CBR, a rank value used for transmission may not be considered in measuring or calculating occupancy ratio.

According to an embodiment of the present disclosure, in case a CBR value measured by the UE is large, for example, in case of a congestion situation, a transmission operation based on a rank value greater than a pre-configured threshold may not be performed. For example, in case the CBR value measured by the UE is larger than a pre-configured threshold, the UE may not be able to perform sidelink transmission using a rank value larger than a pre-configured threshold. For example, in case the CBR value measured by the UE is larger than a pre-configured threshold, the UE may perform sidelink transmission using a rank value less than or equal to a pre-configured threshold.

For example, in case a CBR value measured by the UE is large, for example, in case of a congestion situation, a transmission operation based on the number of layers larger than a pre-configured threshold may not be performed. For example, in case the CBR value measured by the UE is larger than a pre-configured threshold, the UE may not be able to perform sidelink transmission using the number of layers larger than a pre-configured threshold. For example, in case the CBR value measured by the UE is larger than a pre-configured threshold, the UE may perform sidelink transmission using the number of layers less than or equal to a pre-configured threshold.

For example, in case a CBR value measured by the UE is large, for example, in case of a congestion situation, a transmission operation based on the number of antenna ports larger than a pre-configured threshold may not be performed. For example, in case the CBR value measured by the UE is larger than a pre-configured threshold, the UE may not be able to perform sidelink transmission using the number of antenna ports larger than a pre-configured threshold. For example, in case the CBR value measured by the UE is larger than a pre-configured threshold, the UE may perform sidelink transmission using the number of antenna ports less than or equal to a pre-configured threshold.

For example, the maximum rank value allowed for sidelink transmission of the UE may be configured per a CBR measurement value, differently. For example, the maximum rank value allowed for sidelink transmission of the UE may be configured not only per a CBR measurement value, but also per a V2X resource pool, per a BWP, per a service type, per a service-related PPPP, per a service-related PPPR, and/or per a numerology, independently or differently.

For example, the maximum number of layers allowed for sidelink transmission of the UE may be configured per a CBR measurement value, differently. For example, the maximum number of layers allowed for sidelink transmission of the UE may be configured not only per a CBR measurement value, but also per a V2X resource pool, per a BWP, per a service type, per a service-related PPPP, per a service-related PPPR, and/or per a numerology, independently or differently.

For example, the maximum number of antenna ports allowed for sidelink transmission of the UE may be configured per a CBR measurement value, differently. For example, the maximum number of antenna ports allowed for sidelink transmission of the UE may be configured not only per a CBR measurement value, but also per a V2X resource pool, per a BWP, per a service type, per a service-related PPPP, per a service-related PPPR, and/or per a numerology, independently or differently.

Figure 25:
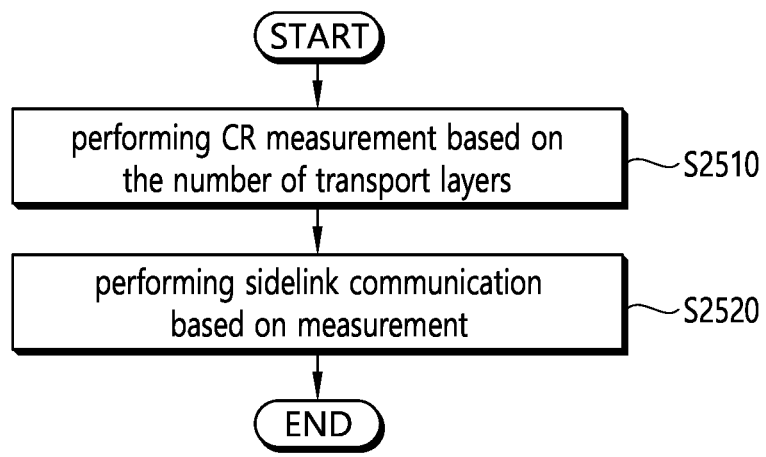
FIG. 25 shows a method in which the first device (100) performs sidelink communication, in accordance with an embodiment of the present disclosure.

FIG. 25 shows a method in which the first device (100) performs sidelink communication, in accordance with an embodiment of the present disclosure. The embodiment of FIG. 25 may be combined with various embodiments of the present disclosure.

Referring to FIG. 25, in step S2510, the first device (100) may perform a channel occupancy ratio (CR) measurement based on a number of transport layers.

For example, performing the CR measurement based on the number of transport layers may comprise: determining a first CR value, and adjusting the first CR value to a second CR value based on the number of transport layers. For example, the second CR value may be a value obtained by multiplying the first CR value by the number of the transport layers. For example, the second CR value may be a value obtained by multiplying the first CR value by a pre-configured value related to the number of the transport layers. For example, the pre-configured value may be configured based on at least one of a V2X resource pool, a bandwidth part (BWP), a service type, a service-related ProSe Per Packet Priority (PPPP), a service-related ProSe Per Packet Reliability (PPPR), or a numerology. For example, as the number of transport layers increases, a CR value obtained based on the CR measurement may be increase.

Additionally, the first device (100) may perform the CR measurement based on a number of transmit antenna ports. For example, performing the CR measurement based on the number of transmit antenna ports may comprise: determining a first CR value, and adjusting the first CR value to a second CR value based on the number of transmit antenna ports. For example, the second CR value may be a value obtained by multiplying the first CR value by the number of transmit antenna ports. For example, the second CR value may be a value obtained by multiplying the first CR value by a pre-configured value related to the number of the transmit antenna ports. For example, the pre-configured value may be configured based on at least one of a V2X resource pool, a bandwidth part (BWP), a service type, a service-related ProSe Per Packet Priority (PPPP), a service-related ProSe Per Packet Reliability (PPPR), or a numerology. For example, as the number of transmit antenna ports increases, a CR value obtained based on the CR measurement may be increase.

In step S2520, the first device (100) may perform the sidelink communication based on the measurement.

Figure 26:
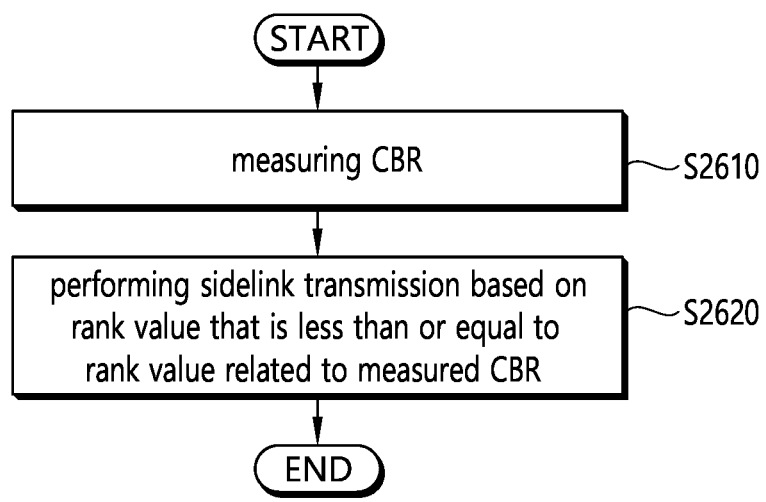
FIG. 26 shows a method in which the first device (100) performs sidelink transmission, in accordance with an embodiment of the present disclosure.

FIG. 26 shows a method in which the first device (100) performs sidelink transmission, in accordance with an embodiment of the present disclosure. The embodiment of FIG. 26 may be combined with various embodiments of the present disclosure.

Referring to FIG. 25, in step S2510, the first device (100) may measure a channel busy ratio (CBR).

In step S2520, the first device (100) may perform the sidelink transmission based on a rank value that is less than or equal to a rank value related to the measured CBR.

For example, the rank value may include at least one of a number of transport layers and a number of transmit antenna ports. For example, each of a plurality of CBRs may be related to each of different rank values. For example, the rank value may be configured based on at least one of a V2X resource pool, a bandwidth part (BWP), a service type, a service-related ProSe Per Packet Priority (PPPP), a service-related ProSe Per Packet Reliability (PPPR), or a numerology.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 27:
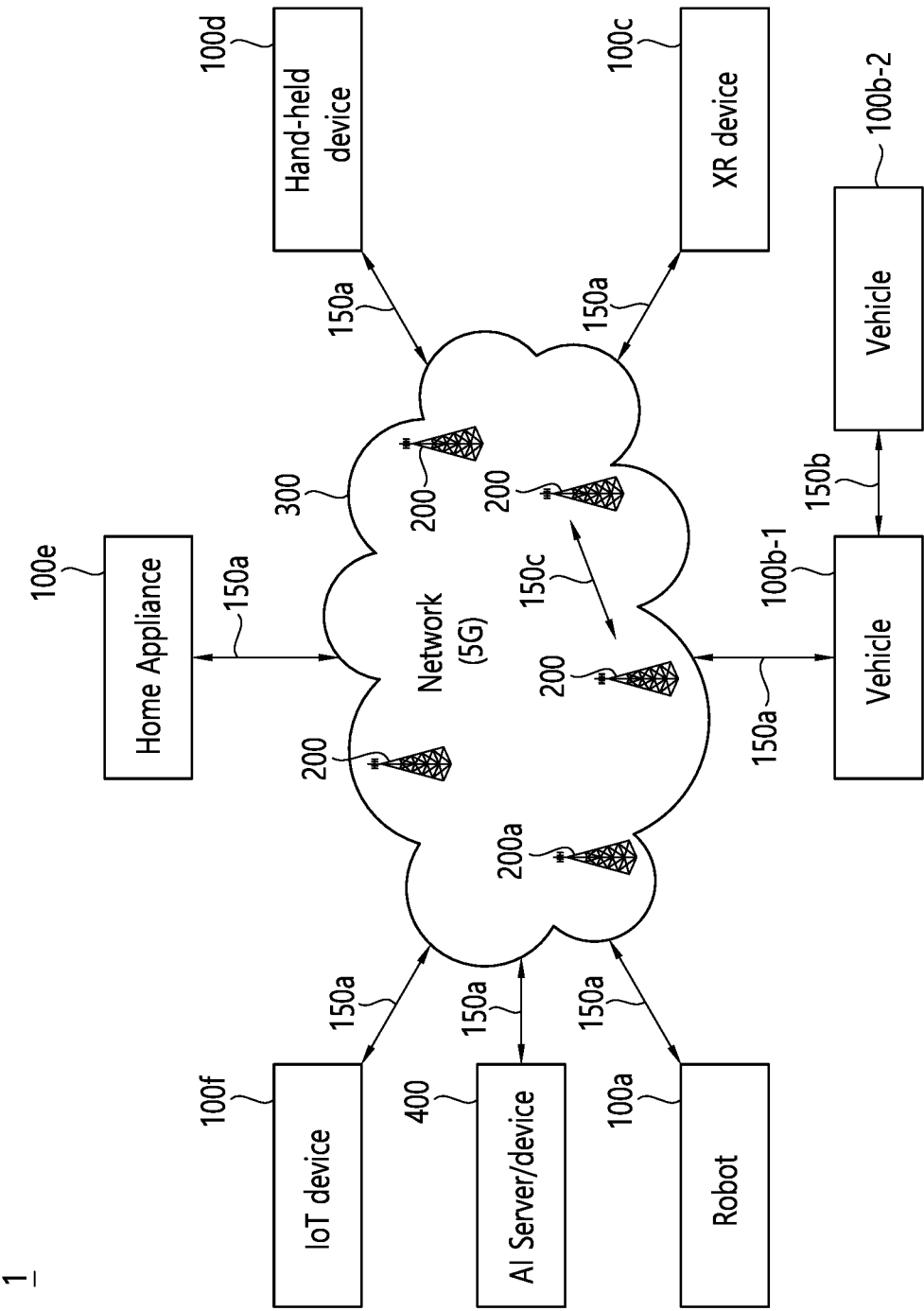
FIG. 27 shows a communication system 1, in accordance with an embodiment of the present disclosure.

FIG. 27 shows a communication system (1) in accordance with an embodiment of the present disclosure.

Referring to FIG. 27, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 28:
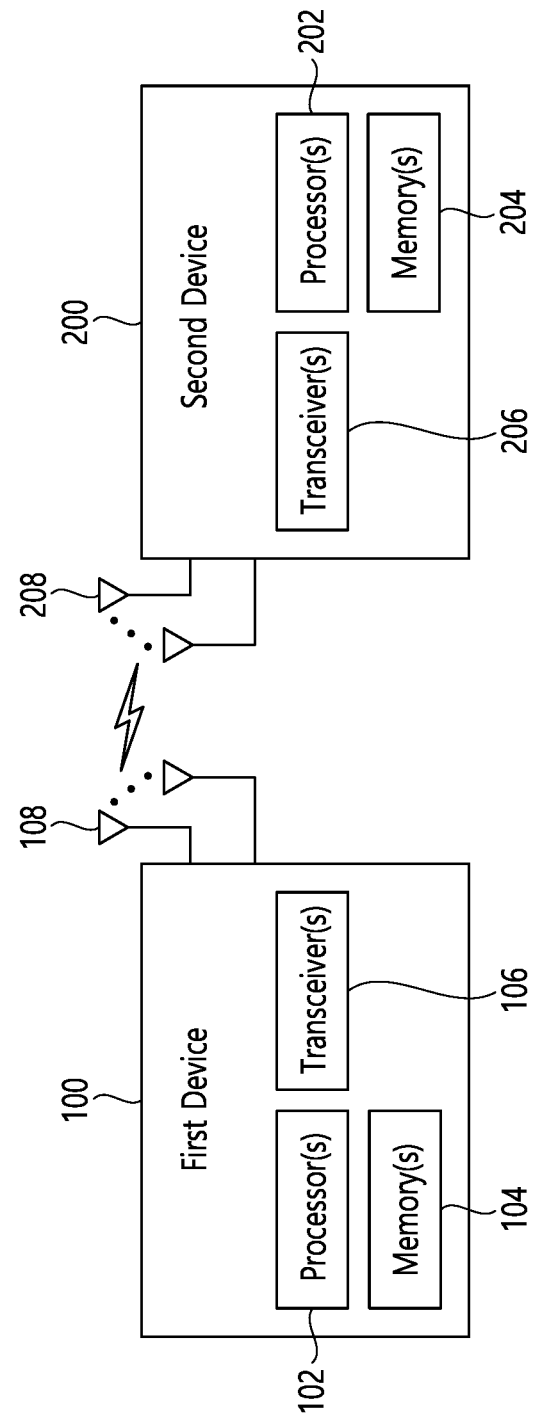
FIG. 28 shows wireless devices, in accordance with an embodiment of the present disclosure.

FIG. 28 shows wireless devices in accordance with an embodiment of the present disclosure.

Referring to FIG. 28, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 27.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 29:
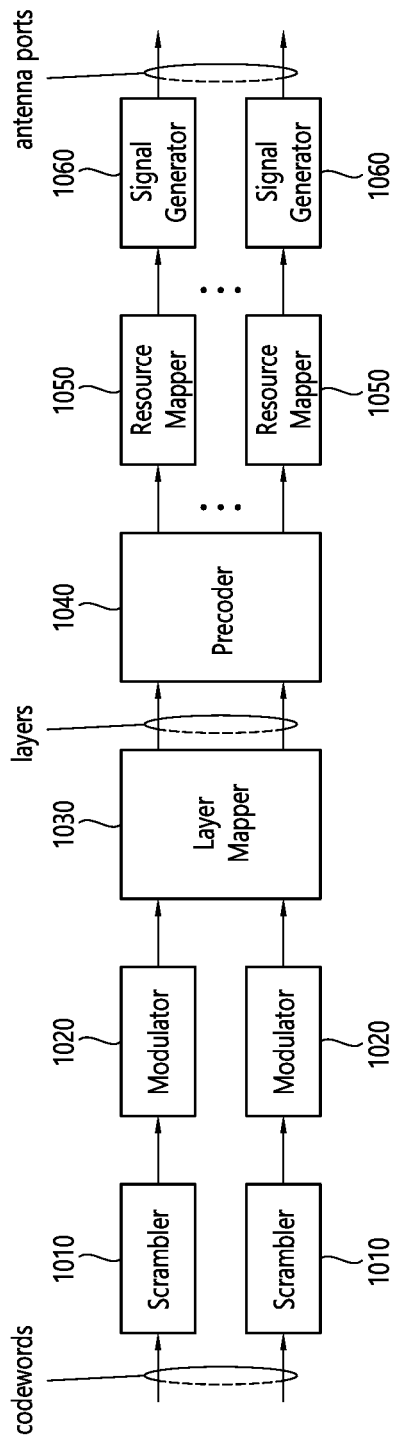
FIG. 29 shows a signal process circuit for a transmission signal, in accordance with an embodiment of the present disclosure.

FIG. 29 shows a signal process circuit for a transmission signal in accordance with an embodiment of the present disclosure.

Referring to FIG. 29, a signal processing circuit (1000) may include scramblers (1010), modulators (1020), a layer mapper (1030), a precoder (1040), resource mappers (1050), and signal generators (1060). An operation/function of FIG. 29 may be performed, without being limited to, the processors (102, 202) and/or the transceivers (106, 206) of FIG. 28. Hardware elements of FIG. 29 may be implemented by the processors (102, 202) and/or the transceivers (106, 206) of FIG. 28. For example, blocks 1010~1060 may be implemented by the processors (102, 202) of FIG. 28. Alternatively, the blocks 1010~1050 may be implemented by the processors (102, 202) of FIG. 28 and the block 1060 may be implemented by the transceivers (106, 206) of FIG. 28.

Codewords may be converted into radio signals via the signal processing circuit (1000) of FIG. 29. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 29. For example, the wireless devices (e.g., 100, 200 of FIG. 28) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 30:
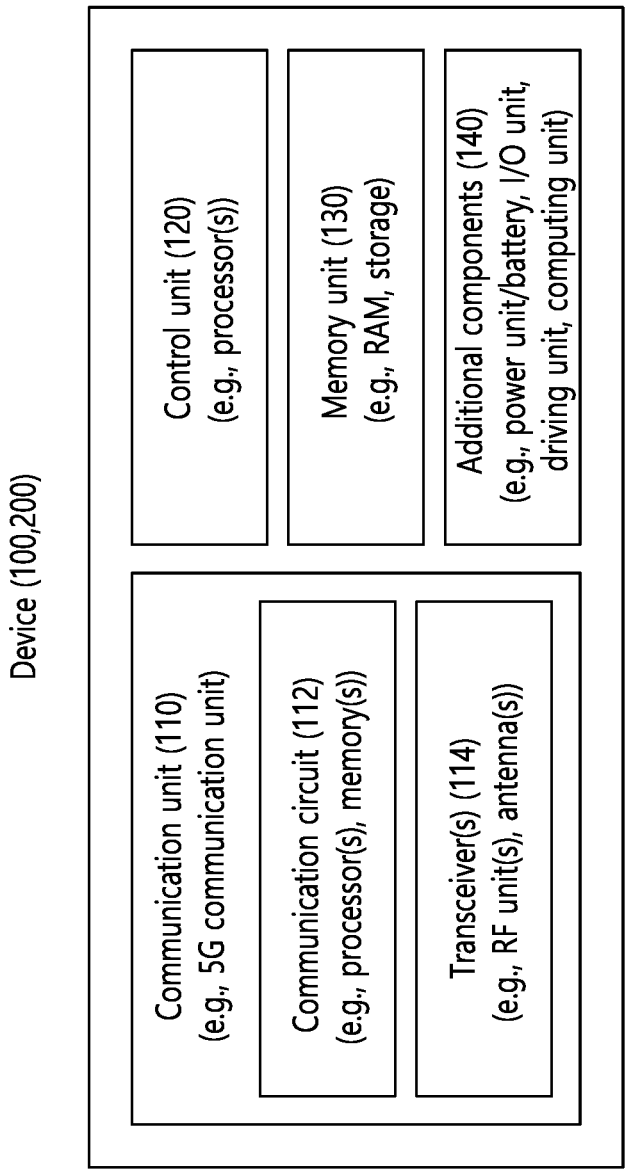
FIG. 30 shows another example of a wireless device, in accordance with an embodiment of the present disclosure.

FIG. 30 shows another example of a wireless device in accordance with an embodiment of the present disclosure. The wireless device may be implemented in various forms according to a use-case/service (refer to FIG. 27).

Referring to FIG. 30, wireless devices (100, 200) may correspond to the wireless devices (100, 200) of FIG. 28 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 28. For example, the transceiver(s) (114) may include the one or more transceivers (106, 206) and/or the one or more antennas (108, 208) of FIG. 28. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 27), the vehicles (100b-1 and 100b-2 of FIG. 27), the XR device (100c of FIG. 27), the hand-held device (100d of FIG. 27), the home appliance (100e of FIG. 27), the IoT device (100f of FIG. 27), a digital broadcast terminal, a hologram device, a public safety device, an MTC device, a medicine device, a fintech device (or a finance device), a security device, a climate/environment device, the AI server/device (400 of FIG. 27), the BSs (200 of FIG. 27), a network node, etc. The wireless device may be used in a mobile or fixed place according to a use-example/service.

In FIG. 30, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 30 will be described in detail with reference to the drawings.

Figure 31:
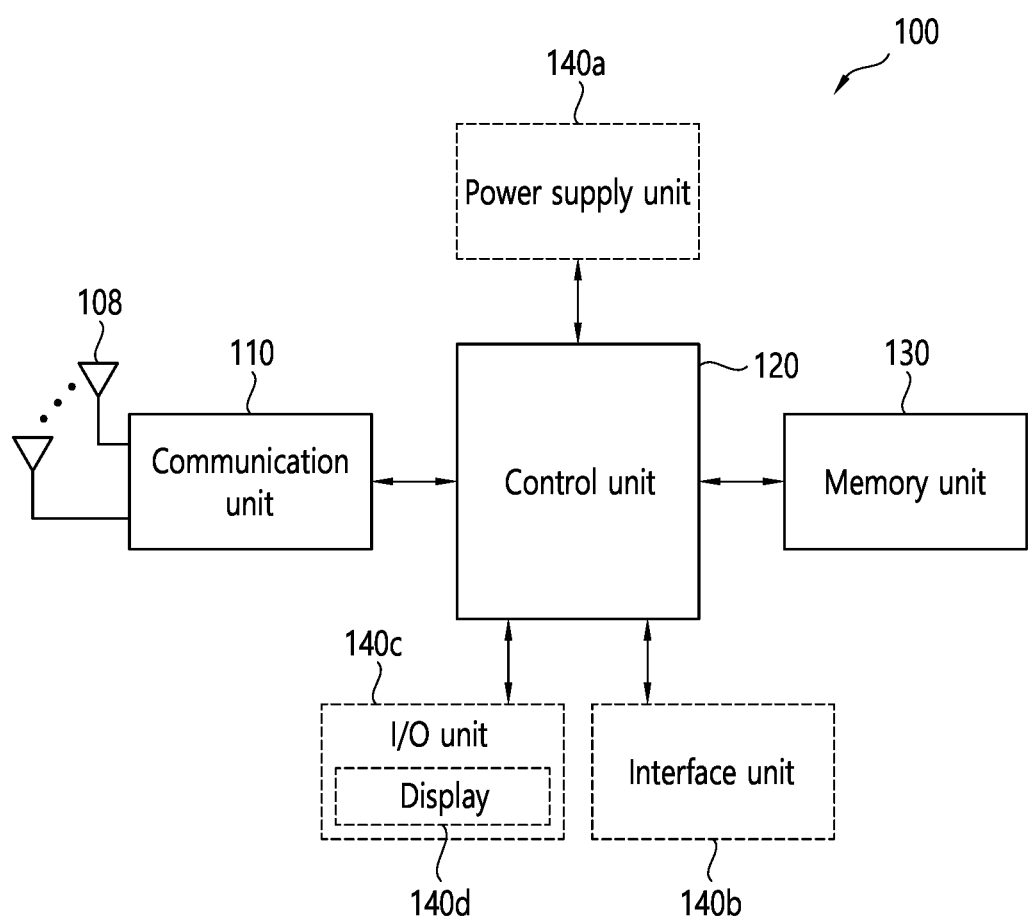
FIG. 31 shows a hand-held device, in accordance with an embodiment of the present disclosure.

FIG. 31 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 31, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 30, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 32:
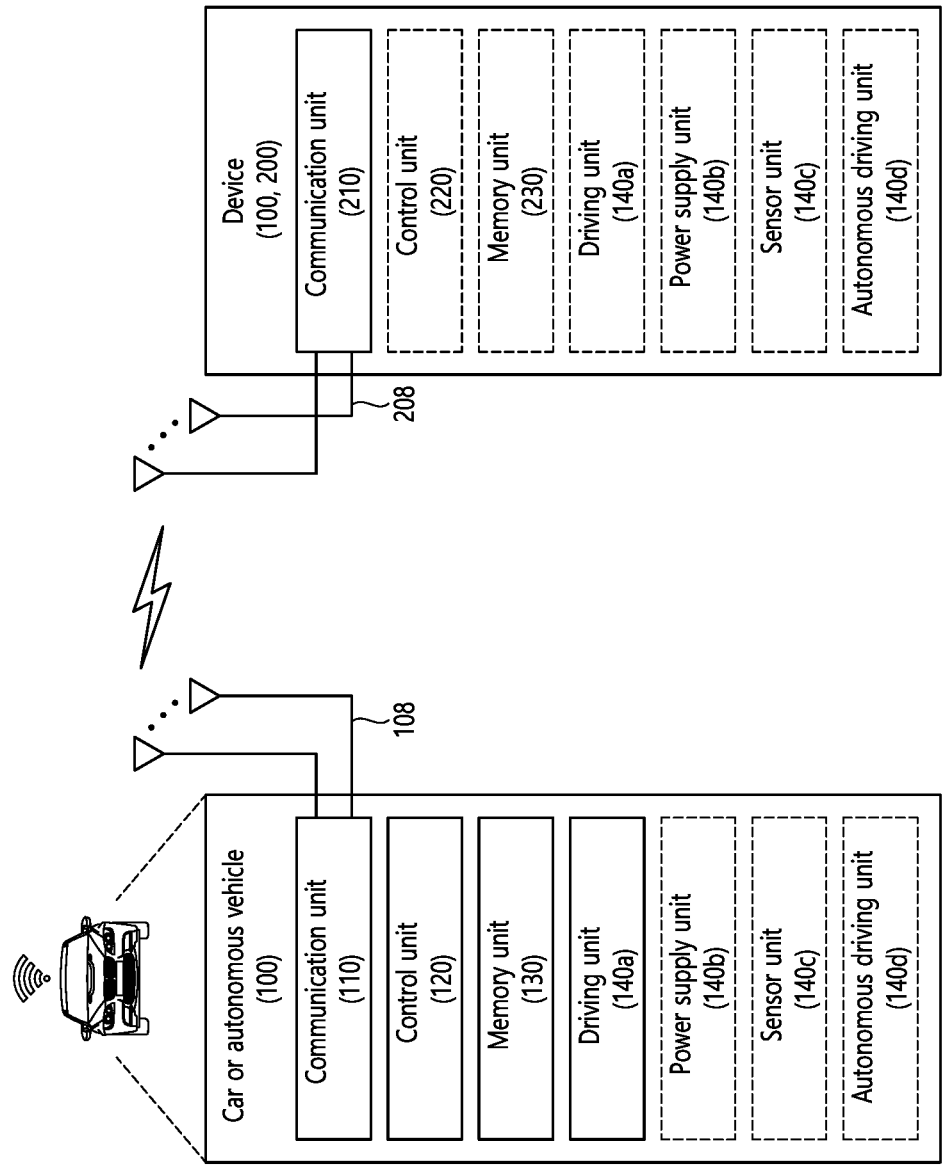
FIG. 32 shows a vehicle or an autonomous vehicle, in accordance with an embodiment of the present disclosure.

FIG. 32 shows a vehicle or an autonomous vehicle in accordance with an embodiment of the present disclosure. The vehicle or autonomous vehicle may be implemented by a mobile robot, a car, a train, a manned/unmanned Aerial Vehicle (AV), a ship, etc.

Referring to FIG. 32, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 30, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 33:
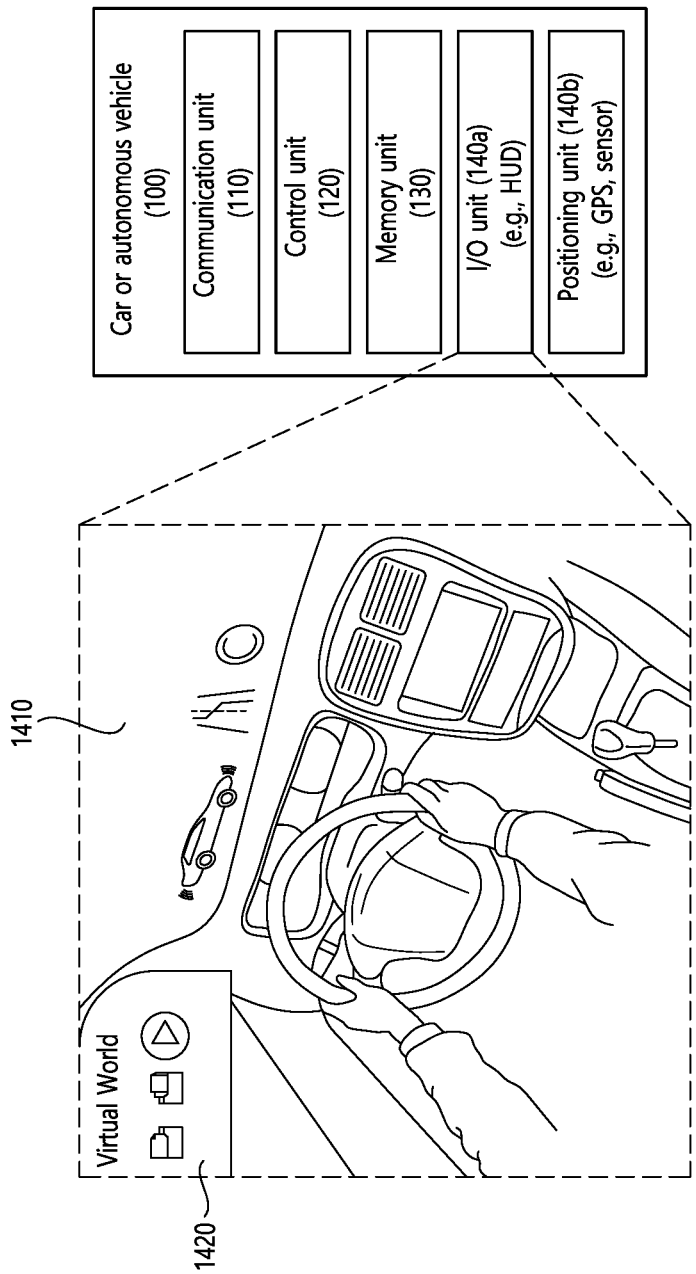
FIG. 33 shows a vehicle, in accordance with an embodiment of the present disclosure.

FIG. 33 shows a vehicle in accordance with an embodiment of the present disclosure. The vehicle may be implemented as a transport means, an aerial vehicle, a ship, etc.

Referring to FIG. 33, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 30.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 34:
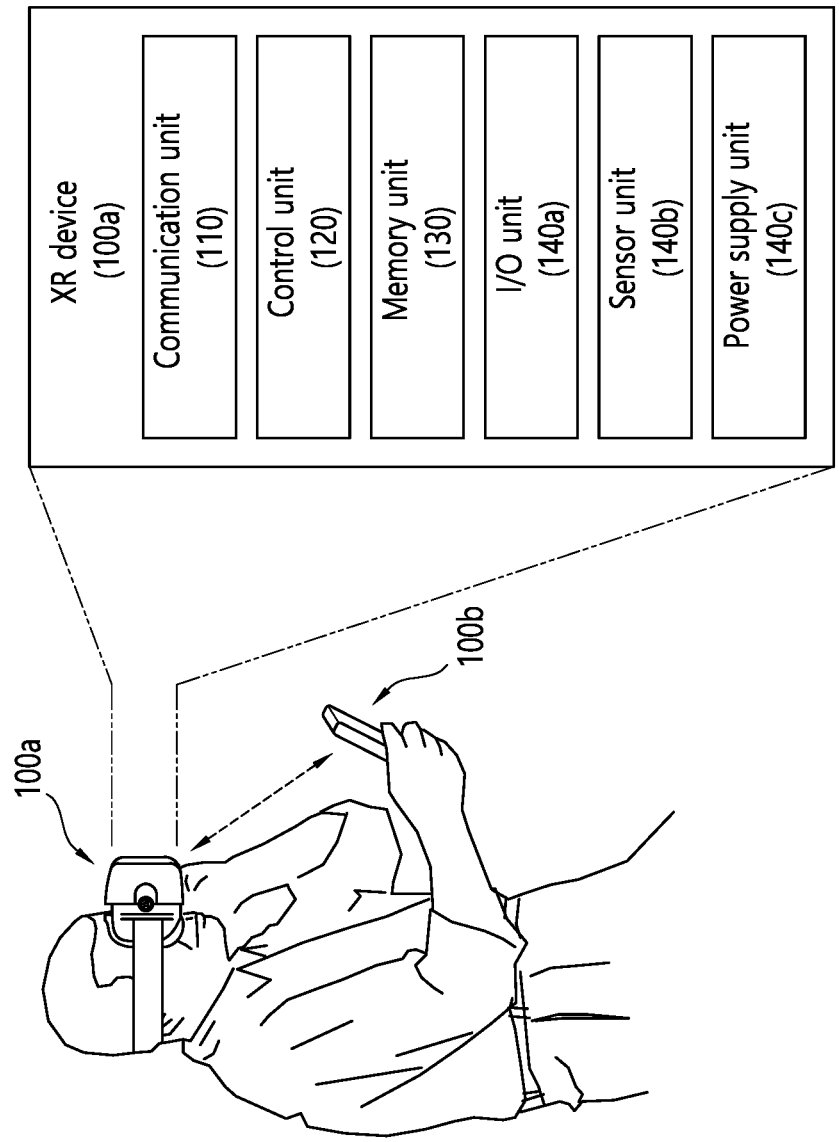
FIG. 34 shows an XR device, in accordance with an embodiment of the present disclosure.

FIG. 34 shows an XR device in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 34, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 30, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 35:
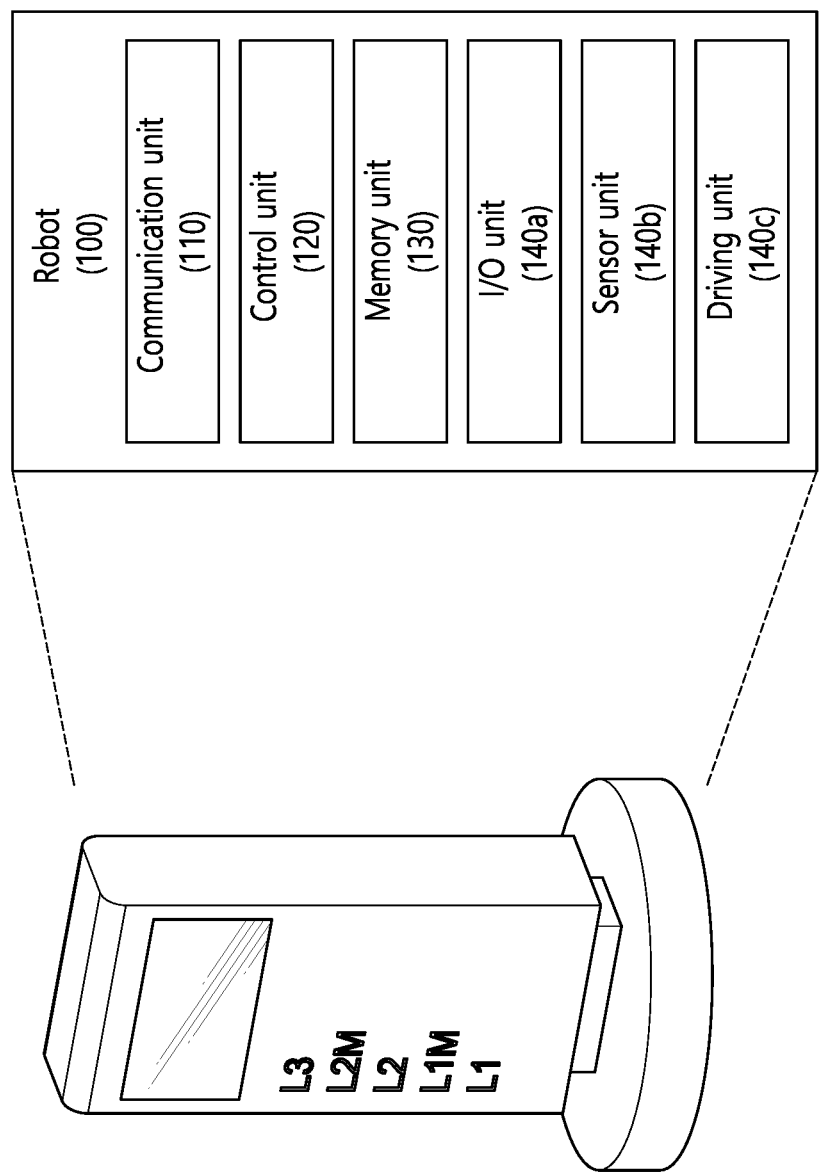
FIG. 35 shows a robot, in accordance with an embodiment of the present disclosure.

FIG. 35 shows a robot in accordance with an embodiment of the present disclosure. The robot may be categorized into an industrial robot, a medical robot, a household robot, a military robot, etc., according to a used purpose or field.

Referring to FIG. 35, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 30, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module.

The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 36:
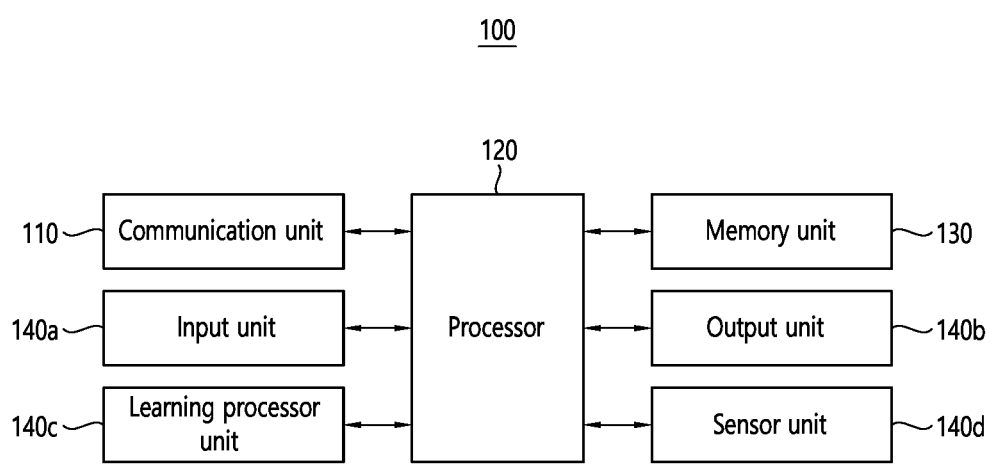
FIG. 36 shows an AI device, in accordance with an embodiment of the present disclosure.

FIG. 36 shows an AI device in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 36, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 30, respectively.

The communication unit (110) may transmit and receive wired/radio signals (e.g., sensor information, user input, learning models, or control signals) to and from external devices such as other AI devices (e.g., 100x, 200, or 400 of FIG. 27) or an AI server (e.g., 400 of FIG. 27) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 27). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 27). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device (100), sidelink communication, the method comprising:
    performing a channel occupancy ratio (CR) measurement based on a number of transport layers; and
    performing the sidelink communication based on the CR measurement,
    wherein the CR measurement is performed by determining a first CR value, and adjusting the first CR value to a second CR value based on the number of transport layers.

2. The method of claim 1, wherein the second CR value is a value obtained by multiplying the first CR value by the number of the transport layers.

3. The method of claim 1, wherein the second CR value is a value obtained by multiplying the first CR value by a pre-configured value related to the number of the transport layers.

4. The method of claim 3, wherein the pre-configured value is configured based on at least one of a V2X resource pool, a bandwidth part (BWP), a service type, a service-related ProSe Per Packet Priority (PPPP), a service-related ProSe Per Packet Reliability (PPPR), or a numerology.

5. The method of claim 1, wherein, as the number of transport layers increases, a CR value obtained based on the CR measurement is increase.

6. The method of claim 1, further comprising:
    performing the CR measurement based on a number of transmit antenna ports.

7. The method of claim 6, wherein performing the CR measurement based on the number of transmit antenna ports comprises: determining the first CR value, and adjusting the first CR value to the second CR value based on the number of transmit antenna ports.

8. The method of claim 7, wherein the second CR value is a value obtained by multiplying the first CR value by the number of transmit antenna ports.

9. The method of claim 7, wherein the second CR value is a value obtained by multiplying the first CR value by a pre-configured value related to the number of the transmit antenna ports.

10. A method for performing, by a first device (100), sidelink transmission, the method comprising:
   measuring a channel busy ratio (CBR); and
   performing the sidelink transmission based on a rank value that is less than or equal to a rank value related to the measured CBR,
   wherein the rank value includes at least one of a number of transport layers and a number of transmit antenna ports.

11. The method of claim 10, wherein each of a plurality of CBRs are related to each of different rank values.

12. The method of claim 10, wherein the rank value is configured based on at least one of a V2X resource pool, a bandwidth part (BWP), a service type, a service-related ProSe Per Packet Priority (PPPP), a service-related ProSe Per Packet Reliability (PPPR), or a numerology.

13. A first device (100) performing sidelink communication, the first device (100) comprising:
   one or more memories; one or more transceivers; and one or more processors connected to the one or more memories and the one or more transceivers, wherein the one or more processors are configured to:
   perform a channel occupancy ratio (CR) measurement based on a number of transport layers; and
   perform the sidelink communication based on the CR measurement,
   wherein the CR measurement is performed by determining a first CR value, and adjusting the first CR value to a second CR value based on the number of transport layers.

* * * * *